United States Patent
Bartosik et al.

(10) Patent No.: US 11,958,111 B2
(45) Date of Patent: Apr. 16, 2024

(54) GASEOUS IONIZATION DETECTORS FOR MONITORING AND CONTROLLING ENERGY BEAMS USED TO ADDITIVELY MANUFACTURE THREE-DIMENSIONAL OBJECTS

(71) Applicant: General Electric Company, Schenectady, NY (US)

(72) Inventors: David Alan Bartosik, West Chester, OH (US); Thomas Graham Spears, Fairfield, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/180,994

(22) Filed: Feb. 22, 2021

(65) Prior Publication Data
US 2022/0266340 A1    Aug. 25, 2022

(51) Int. Cl.
*B22F 12/41* (2021.01)
*B22F 10/36* (2021.01)
(Continued)

(52) U.S. Cl.
CPC .............. *B22F 10/36* (2021.01); *B22F 10/85* (2021.01); *B22F 12/41* (2021.01); *B22F 12/70* (2021.01);
(Continued)

(58) Field of Classification Search
CPC .......... B33Y 10/00; B33Y 30/00; B33Y 50/02
See application file for complete search history.

(56) References Cited

U.S. PATENT DOCUMENTS

| 4,528,452 A | 7/1985 | Livesay |
| 6,537,052 B1 | 3/2003 | Adler |

(Continued)

FOREIGN PATENT DOCUMENTS

| EP | 2416342 B1 | 6/2016 |
| JP | H07230784 A | * 8/1995 |

OTHER PUBLICATIONS

Sensidyne Industrial Health & Safety Instrumentation Point Hydrocarbons-IR https://web.archive.org/web/20160305031431/http://www.sensidynegasdetection.com/products/industrial-point-gas-detection-products/point-hydrocarbons-ir-gas-detector (Year: 2016).*

(Continued)

*Primary Examiner* — Farah Taufiq
(74) *Attorney, Agent, or Firm* — Dinsmore & Shohl LLP

(57) ABSTRACT

An additive manufacturing machine may include a beam source, a process chamber, a beam column operably coupled to the process chamber and/or defining a portion of the process chamber, and a gaseous ionization detector disposed about the beam column. The gaseous ionization detector may be configured to detect elementary particles corresponding to an ionizing gas ionized by an energy beam from the beam source. A method of additively manufacturing a three-dimensional object may include determining data from a gaseous ionization detector disposed about a beam column of an additive manufacturing machine, and additively manufacturing a three-dimensional object using the additive manufacturing machine based at least in part on the data from the gaseous ionization detector. A computer-readable medium may include computer-executable instructions, which when executed by a processor associated with an additive manufacturing machine, cause the additive manufacturing machine to perform a method in accordance with the present disclosure.

15 Claims, 15 Drawing Sheets

(51) Int. Cl.
 B22F 10/85 (2021.01)
 B22F 12/70 (2021.01)
 B22F 12/90 (2021.01)
 B33Y 10/00 (2015.01)
 B33Y 30/00 (2015.01)
 B33Y 50/02 (2015.01)

(52) U.S. Cl.
 CPC .............. *B22F 12/90* (2021.01); *B33Y 10/00* (2014.12); *B33Y 30/00* (2014.12); *B33Y 50/02* (2014.12); *B22F 2201/02* (2013.01); *B22F 2201/11* (2013.01); *B22F 2201/12* (2013.01)

(56) References Cited

U.S. PATENT DOCUMENTS

| | | | |
|---|---|---|---|
| 6,646,728 | B1 | 11/2003 | Tang et al. |
| 6,774,646 | B1 | 8/2004 | Han et al. |
| 7,294,954 | B2 | 11/2007 | Syms |
| 7,411,191 | B2 | 8/2008 | Nakasuji et al. |
| 7,417,236 | B2 | 8/2008 | Nakasuji et al. |
| 8,822,919 | B2 | 9/2014 | Kimba et al. |
| 9,064,671 | B2 | 6/2015 | Ljungblad et al. |
| 9,136,091 | B2 | 9/2015 | Kimba et al. |
| 9,347,770 | B2 | 5/2016 | Snis |
| 10,303,159 | B2 | 5/2019 | Czinger et al. |
| 2011/0114839 | A1* | 5/2011 | Stecker .............. H01J 37/304 250/307 |
| 2018/0311769 | A1 | 11/2018 | TenHouten et al. |
| 2019/0118286 | A1* | 4/2019 | Sugatani .............. B23K 15/02 |
| 2019/0362936 | A1* | 11/2019 | Van Den Berg ........ B22F 10/31 |

OTHER PUBLICATIONS

Translation of JP H07230784 A (Year: 1995).*
Anashin et al., Photomultipliers with Microchannel Plates, Nuclear Instruments and Methods in Physics Research A, 357, 1995, pp. 103-109.
Calabria, Large-Size Triple GEM Detectors for the CMS Forward Muon Upgrade, ScienceDirect, Nuclear and Particle Physics Proceedings, 273-275, 2016, pp. 1042-1047. http://dx.doi.org/10.1016/j.nuclphysbps 2015.09.163.
Gys, Micro-Channel Plates and Vaccum Detectors, Nuclear Instruments and Methods in Physics Research A, ScienceDirect, 797, Geneva Switzerland, 2015, pp. 254-260. http://dx.doi.org/10.1016/j.nima.2014.12.044.
Hamamatsu, Electron Multipliers, TPMH1354E02, Photonics KK Japan, Jan. 2019, 8 Pages.
Hamamatsu, MCP (Microchannel Plate) and MCP Assembly, TMCPC0002EF, Photonics KK Japan, May 2019, 20 Pages.
Mascotto, Silicon Photomultiplier Technology at STMicroelectronics, CERN, Geneva, Feb. 17, 2011, 13 Pages.
Remillard et al., Use of Gas Electron Multiplier (GEM) Detectors for an Advanced X-Ray Monitor, Astrophysics, Cornell University, Mar. 26, 2001, 10 Pages. arXiv:astro-ph/0103428.
Sauli, The Gas Electron Multiplier (GEM): Operating Principles and Applications, Nuclear instruments and Methods in Physics Research A, 805, Switzerland, 2016, pp. 2-24. http://dx.doi.org/10.1016/j.nima.2015.07.060.
Sumiyoshi et al., Single Electron Amplification in a "Single-MC + Micromegas + Pads" Detector, SLAC-PUB-10754, 2003 IEEE Nuclear Science Symposium and Medical Imaging Conference, Portland Oregon, 2003, 5 Pages.
Tao et al., Secondary Electron Emission Materials for Transmission Dynodes in Novel Photomultipliers: A Review, MDPI Journal Materials, vol. 9(12), 1017, 2016, 18 Pages. https://doi.org/10.3390/ma9121017.
Van Der Graaf, MEMS-Made Electron Emission Membranes (MEMBrane), ERC Advanced Grant 2012, Research Proposal (Part B Section 1), National Institute for Subatomic Physics, Amsterdam, 20 Pages.
Van Der Graaf et al., The Timed Photon Counter "Tipsy", Open Technologieprogramma, 16 Pages. http://www.nikhef.nl/~d90/STW_Tipsy_V12.pdf.
Van Der Graaf et al., The Tipsy Single Soft Photon Detector and the Trixy Ultrafast Tracking Detector, Journal of Instrumentation, JINST 8 C01036, Figueira Da Foz, Portugal, Jan. 23, 2013, 9 Pages. http://dx.doi.org/10.1088/1748-0221/8/01/C01036.
Wiza, Microchannel Plate Detectors, TP209/Mar. 08, Nuclear Instruments and Methods, Photonis, vol. 162, 1979, pp. 587-601.

* cited by examiner

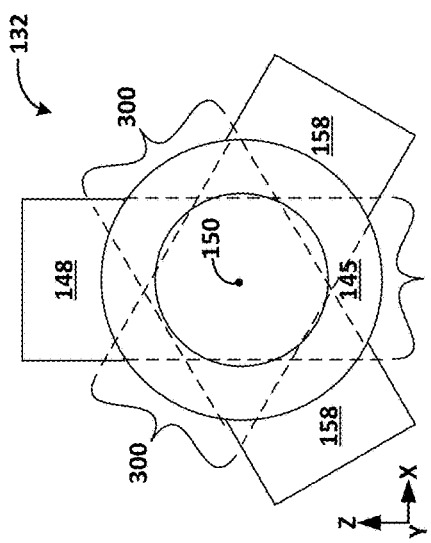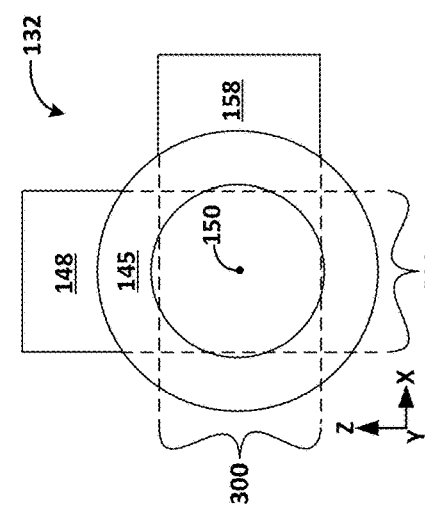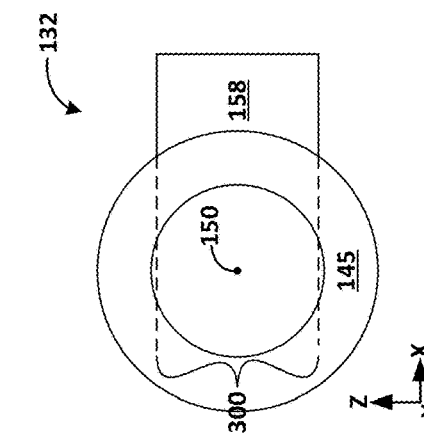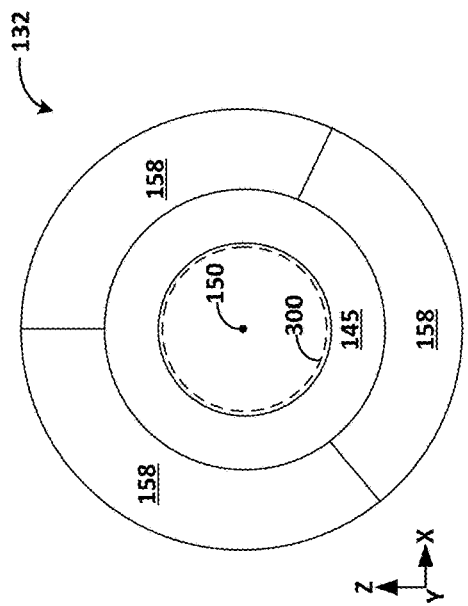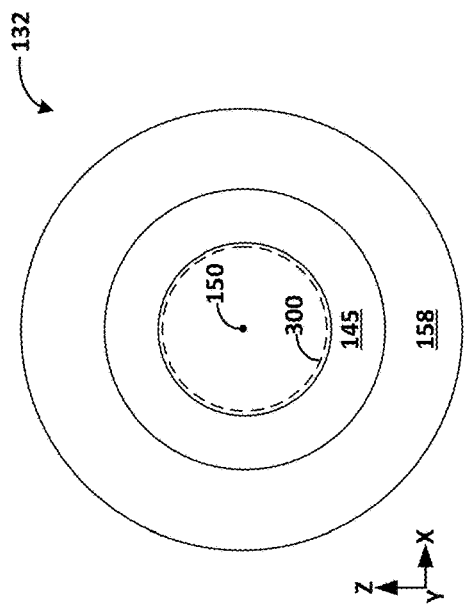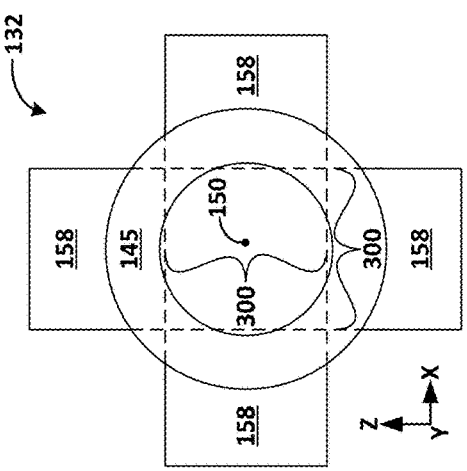

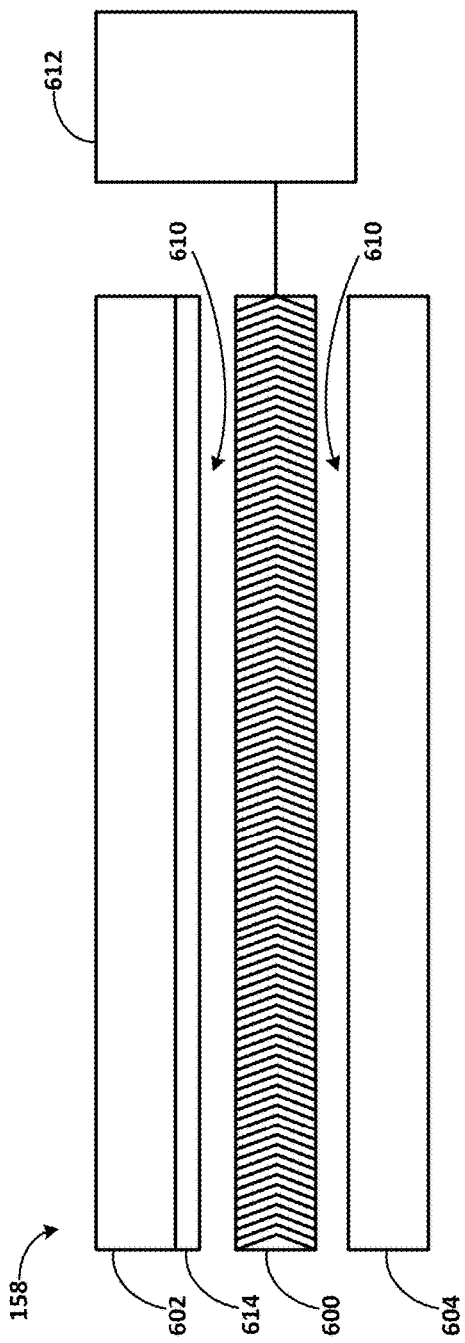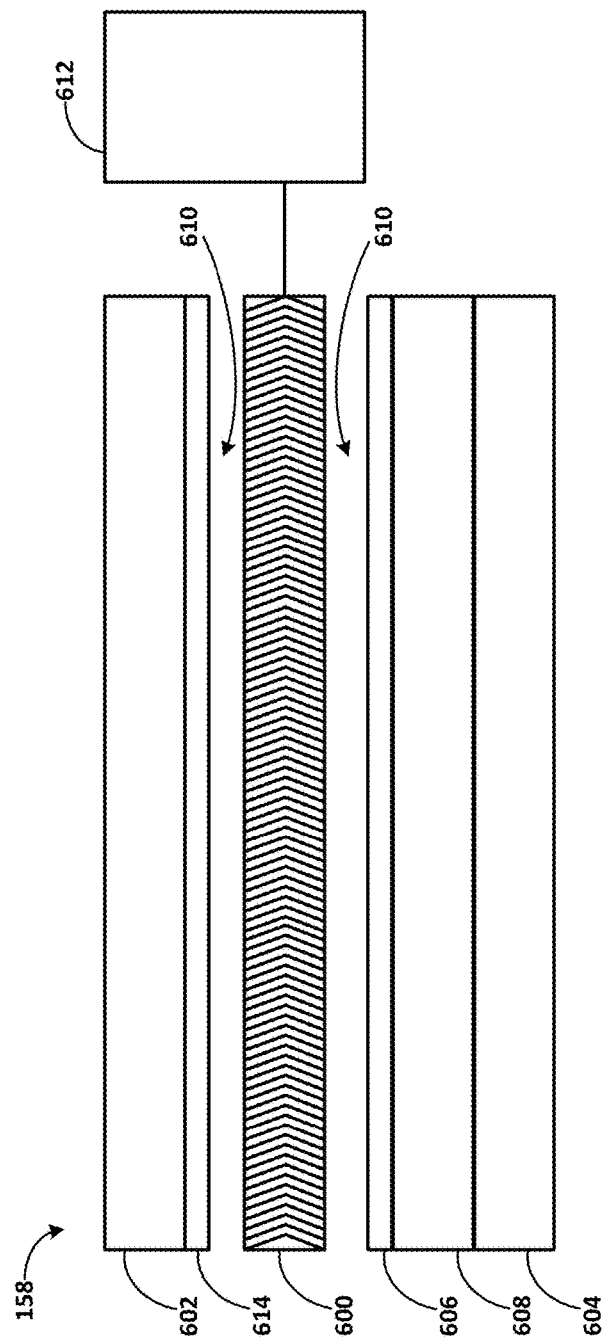
FIG. 6A
FIG. 6B

GASEOUS IONIZATION DETECTORS FOR MONITORING AND CONTROLLING ENERGY BEAMS USED TO ADDITIVELY MANUFACTURE THREE-DIMENSIONAL OBJECTS

FIELD

The present disclosure generally pertains to additive manufacturing machines, and more particularly, to monitoring and controlling energy beams used to additively manufacture three-dimensional objects.

BACKGROUND

Additive manufacturing machines may form three-dimensional objects by solidifying build material with one or more energy beams emitted from one or more energy beam devices. The energy beams and/or the energy beam devices may have variability attributable to any of a number of irradiation parameters. Such irradiation parameters may impact solidification characteristics when additively manufacturing three-dimensional objects, as well as the properties or quality of such objects.

Information pertaining to an energy beam and/or an energy beam device may be utilized to improve additive manufacturing operations and/or properties or quality of objects formed in the additive manufacturing operations.

Accordingly, there exists a need for improved apparatuses, systems, and methods for monitoring and controlling additive manufacturing machines, including energy beam devices thereof and/or energy beams emitted therefrom used to additively manufacture three-dimensional objects.

BRIEF DESCRIPTION

Aspects and advantages will be set forth in part in the following description, or may be apparent from the description, or may be learned through practicing the presently disclosed subject matter.

In one aspect, the present disclosure embraces additive manufacturing machines. An exemplary additive manufacturing machine may include a beam source; a process chamber; a beam column operably coupled to the process chamber and/or defining a portion of the process chamber; and a gaseous ionization detector disposed about the beam column. The gaseous ionization detector may be configured to detect elementary particles corresponding to an ionizing gas ionized by an energy beam from the beam source.

In another aspect, the present disclosure embraces methods of additively manufacturing a three-dimensional object. An exemplary method may include determining data from a gaseous ionization detector disposed about a beam column of an additive manufacturing machine; and additively manufacturing a three-dimensional object using the additive manufacturing machine based at least in part on the data from the gaseous ionization detector.

In yet another aspect, the present disclosure embraces computer-readable media. Exemplary computer-readable medium may include computer-executable instructions, which when executed by a processor associated with an additive manufacturing machine, cause the additive manufacturing machine to perform a method in accordance with the present disclosure.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 3A-3F schematically depict top cross-sectional views of exemplary energy beam devices that includes a beam monitoring system with one or more gaseous ionization detectors;

FIGS. 6A and 6B schematically depict exemplary gaseous ionization detectors;

Figure 1:
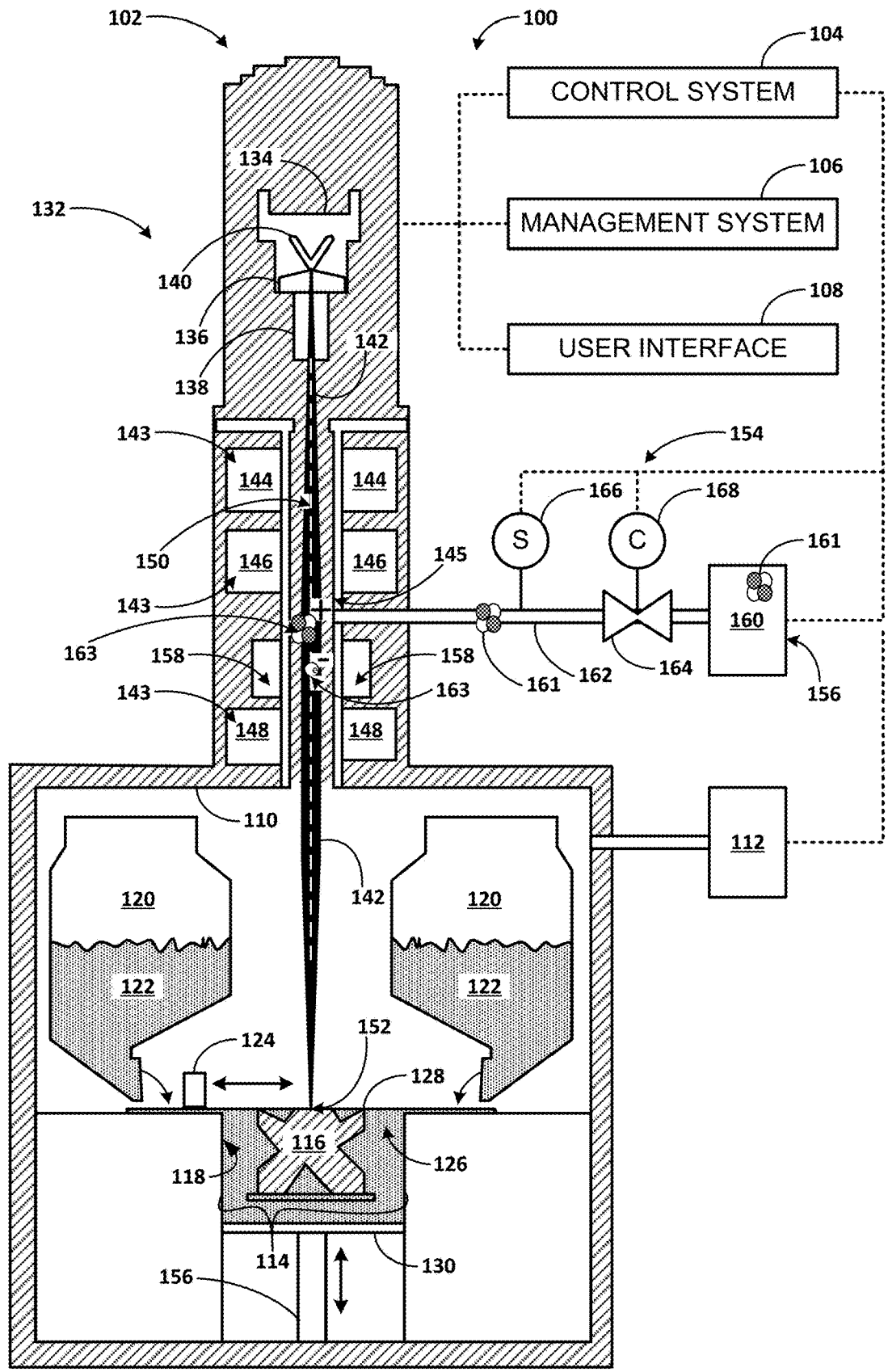
FIG. 1 schematically depicts an exemplary additive manufacturing system that includes an additive manufacturing machine with a beam monitoring system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As described herein, exemplary embodiments of the present subject matter involve the use of additive manufacturing machines or methods. As used herein, the term "additive manufacturing" refers generally to manufacturing technology in which components are manufactured in a layer-by-layer manner. An exemplary additive manufacturing machine may be configured to utilize any desired additive manufacturing technology. In an exemplary embodiment, the additive manufacturing machine may utilize an additive manufacturing technology that includes a powder bed fusion (PBF) technology, such as an electron beam melting (EBM) technology, or an electron beam sintering (EBS) technology. Other suitable additive manufacturing technologies may include additive manufacturing technology that utilizes an energy beam, such as an electron beam or other beam of particles to melt or sinter build material. In an exemplary PBF technology, such as an EBM or EBS technology, thin layers of powder material are sequentially applied to a build plane and then selectively melted or fused to one another with an energy beam in a layer-by-layer manner to form one or more three-dimensional objects. Additively manufactured objects are generally monolithic in nature, and may have a variety of integral sub-components.

As used herein, the term "build plane" refers to a plane defined by a surface upon which an energy beam impinges during an additive manufacturing process. Generally, the surface of a powder bed defines the build plane; however, during irradiation of a respective layer of the powder bed, a previously irradiated portion of the respective layer may define a portion of the build plane, and/or prior to distributing powder material across a build module, a build plate that supports the powder bed generally defines the build plane.

Additive manufacturing technology may generally be described as enabling fabrication of complex objects by building objects point-by-point, layer-by-layer, typically in a vertical direction; however, other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may include commercially pure metals or metal alloys, such as titanium, titanium alloys, aluminum, aluminum alloys, stainless steel, nickel based super alloys, cobalt-chromium alloys, and the like. Further exemplary materials may include electrically conductive powders formed of ceramic, polymers, or any other suitable material. Exemplary materials may be provided in solid, liquid, powder, sheet material, wire, or any other suitable form. Each successive layer may be, for example, between about 10 μm and 200 μm, although the thickness may be selected based on any number of parameters and may be any suitable size according to alternative embodiments.

The present disclosure generally pertains to determining irradiation parameters associated with an energy beam and/or an energy beam system of an additive manufacturing machines. The energy beam system may include a beam source configured to generate an electron beam and to direct the energy beam onto a build plane to additively manufacture a three dimensional object. The irradiation parameters may be determined using a gaseous ionization detector disposed about a beam column of the energy beam system. The gaseous ionization detector may be configured to detect elementary particles corresponding to ionizing gas ionized by the energy beam. Data may be determined from the gaseous ionization detector, and the three-dimensional object may be additively manufactured based at least in part on the data from the gaseous ionization detector.

Exemplary embodiments of the present disclosure will now be described in further detail. FIG. 1 schematically depicts an exemplary additive manufacturing system 100. The additive manufacturing system 100 may include one or more additive manufacturing machines 102. The one or more additive manufacturing machines 102 may include a control system 104. The control system may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a process chamber 110 within which an additive manufacturing process may be carried out. The process chamber 110 may be maintained under vacuum by way of a vacuum pump 112 during the additive manufacturing process. The pressure in the process chamber 110 may be $1 \times 10^{-3}$ mbar or lower. In some embodiments, the vacuum maintained within the process chamber may provide a substantially contamination-free environment that does not require the use of inert gases to evacuate contaminants, such as may be used with laser or arc-based processes.

The process chamber 110 may include a build module 114 that has a build chamber 118 within which an object or objects 116 may be additively manufactured. In some embodiments, an additive manufacturing machine 102 may include one or more powder modules 120 and/or an overflow module (not shown). The build module 114, the powder modules 120, and/or the overflow module (not shown) may be provided in the form of modular containers configured to be installed into and removed from the additive manufacturing machine 102 such as in an assembly-line process. Additionally, or in the alternative, the build module 114, the powder module 120, and/or the overflow module (not shown) may define a fixed componentry of the additive manufacturing machine 102.

The powder module(s) 120 contain a supply of powder material 122. The powder module(s) 120 may be configured to supply the powder material 122 to the build module 114. A recoater 124 such as a blade or roller may spread thin layers of powder material 122 to form a powder bed 126, with the surface of the powder bed 126 defining a build plane 128. A build platform 130 supports the sequential layers of powder material 122 distributed across the build plane 128.

The additive manufacturing machine 102 includes an energy beam system 132 configured to generate one or more energy beams, such as one or more electron beams, and to direct the respective energy beam(s) onto the build plane 128 to selectively solidify respective portions of the powder bed 126 defining the build plane 128. The energy beam system 132 and/or the various controllable components thereof may be operated under control by the control system 104. The control system 104 may include one or more control modules configured to control the energy beam system 132 and/or the various controllable components thereof. The energy beam system 132 may include componentry integrated as part of the additive manufacturing machine 102 and/or componentry that is provided separately from the additive manufacturing machine 102.

The energy beam system 132 may include a beam source 134, such as an electron beam generator. By way of example, a beam source 134 configured to generate an electron beam may include a cathode 136, an anode 138, and a filament 140. The cathode 136, when heated by the filament 140, emits electrons by way of thermionic emission. A voltage difference between the cathode 136 and the anode 138 accelerates the electrons, providing an energy beam 142.

The energy beam 142 may be focused and/or deflect by an electrostatic field provided by the energy beam system 132. The electrostatic field may be provided by one or more electrostatic lenses 143 disposed about a beam column 145. The beam column 145 may define a pathway for an energy beam to be directed upon a build plane 128 in the process chamber 110. For example, as shown, exemplary electrostatic lenses of an energy beam system 132 may include an astigmatism lens 144, a focusing lens 146, and/or a deflection lens 148. The one or more electrostatic lenses may be configured and arranged in the form of an Einzel lens, a quadrupole lens, a magnetic lens, a multipole lens, or the like.

The astigmatism lens 144 may be configured to conform the energy beam 142 about a beam axis 150, for example, under control of the control system 104. In some embodiments, the astigmatism lens 144 may be configured to correct a spherical aberration exhibited by the energy beam 142 and/or to cause the energy beam 142 to exhibit a symmetric cross-sectional beam profile with respect to the beam axis 150. Additionally, or in the alternative, the astigmatism lens 144 may be configured to cause the energy beam 142 to exhibit an asymmetric cross-sectional beam profile, and/or an astigmatic cross-sectional beam profile, with respect to the beam axis 150. Further additionally or in the alternative, the astigmatic lens 144 may be configured to augment the energy beam with respect to one or more meridional planes that include the beam axis 150, such as a sagittal plane and/or a tangential plane. The astigmatism lens 144 may be configured to augment one or more foci along the beam axis 150, such as a sagittal focus and/or a transverse focus.

The focusing lens 146 may be configured to conform the energy beam 142 to a desired focal point 152, for example, under control of the control system 104. Additionally, or in the alternative, the focusing lens 146 may be configured to collimate the energy beam 142.

The deflection lens 148 may be configured to deflect the energy beam 142 to a desired location of the build plane 128, for example, under control of the control system 104. Additionally, or in the alternative, the deflection lens 148 may be configured to deflect the energy beam 142 along an irradiation path to selectively irradiate a portion of the build plane 128. The irradiation path may be defined by a build file for additively manufacturing a three-dimensional object 116.

Still referring to FIG. 1, the energy beam system 132 may include a beam monitoring system 154. The beam monitoring system 154 may include a ionizing gas system 156 and one or more gaseous ionization detectors 158. The ionizing gas system 156 may include a ionizing gas supply chamber 160 and one or more ionizing as supply lines 162. The ionizing gas supply chamber 160 may be pressurized. For example, the ionizing gas supply chamber 160 may include a pressure vessel, such as a tank. The one or more ionizing as supply lines 162 may provide fluid communication between the ionizing gas supply chamber 160 and the process chamber 110. In some embodiments, the one or more ionizing gas supply lines 162 may fluidly communicate with a beam column 145. The beam column 145 may define a portion of the process chamber 110. The beam column 145 may define a portion of the process chamber 110. Additionally, or in the alternative, the beam column 145 may be operably coupled to the process chamber 110. The process chamber 110 and the beam column 145 may a vacuum space that may be subjected to a vacuum environment during additive manufacturing. The pressure in the ionizing gas supply chamber 160 may be sufficient to cause a ionizing gas 161 to flow into the process chamber 110 and/or the beam column 145.

The beam monitoring system 154 and/or the ionizing gas system 156 may include a ionizing gas valve 164. The ionizing gas valve 164 may be configured to regulate a flow of ionizing gas 161 flowing through the one or more ionizing gas supply lines 162, into the process chamber 110 and/or into the beam column 145. Exemplary ionizing gases 161 may include inert gases, such as noble gases. For example, exemplary ionizing gases 161 may include helium, neon, argon, krypton, and/or xenon. In exemplary embodiments, helium may be utilized. Advantageously, helium or other low molecular weight ionizing gases 161 may be introduced without causing electron beam scattering, which may compromise the resolution of the energy beam 142.

An ionizing gas sensor 166 may be configured to determine a concentration, pressure, and/or flow rate of ionizing gas 161. As shown, the ionizing gas sensor 166 may be configured to obtain measurements at a location along the one or more ionizing as supply lines 162. Additionally, or in the alternative, the ionizing gas sensor 166 may be configured to obtain measurements at a location within the process chamber 110 and/or within the beam column 145. An ionizing gas controller 168 may be configured to control a concentration, pressure, and/or flow rate of the ionizing gas, for example, based at least in part on a measurement from the ionizing gas sensor 166. The ionizing gas controller 168 may include a control valve or the like operably coupled to a control system 104.

The beam monitoring system 154 may include one or more gaseous ionization detectors 158 disposed about one or more locations of the beam column 145. When ionizing gas from the ionizing gas system 156 approaches and/or becomes incident upon the energy beam 142, the energy beam 142 may ionize at least a portion of such ionizing gas 161, providing ionized gas 163 and one or more elementary particles 165 separated from the ionizing gas 161. As used herein, the term "elementary particle" 165 refers to an electron, a proton, or a photon. It is appreciated that in the Standard Model of particle physics, there are several classes of elementary particles, which may be categorized as elementary fermions and elementary bosons, those skilled in the art will appreciate that the present disclosure is primarily concerned with elementary particles consisting of an electron, a proton, or a photon, and that such other elementary particles within the Standard Model may nevertheless find applicability to the present disclosure in some embodiments.

In an exemplary embodiment, an elementary particle 165 may be an electron. In another exemplary embodiment, an elementary particle 165 may be a photon. The elementary particle 165 (e.g., an electron and/or a photon), and/or the ionized gas 163, may interact with the one or more gaseous ionization detectors 158. The one or more gaseous ionization detectors 158 may be respectively configured to determine one or more properties of the energy beam 142. The one or more properties of the energy beam 142 may be determined based at least in part on the elementary particles 165 (e.g., electrons and/or photons), and/or the ionized gas 163 interacting with a respective one of the gaseous ionization detectors 158.

The one or more gaseous ionization detectors 158 may be located at any desired position of the beam column 145. In some embodiments, one or more gaseous ionization detectors 158 may be located upstream and/or downstream from one or more electrostatic lenses, such as upstream and/or downstream from an astigmatism lens 144, from a focusing lens 146, and/or from a deflection lens 148.

Figure 2A:
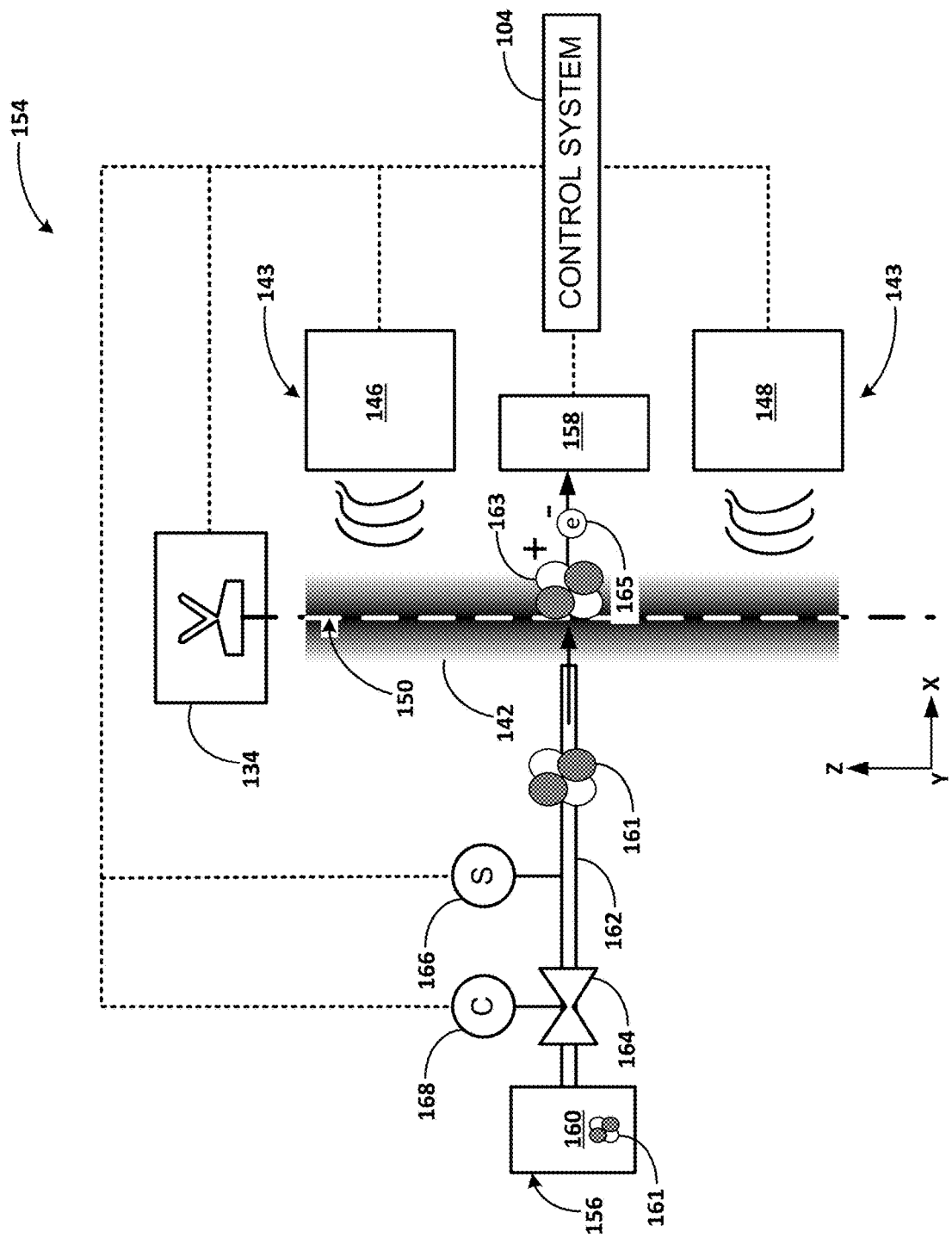
FIGS. 2A and 2B schematically depict side cross-sectional views of exemplary energy beam devices that include a beam monitoring system with one or more gaseous ionization detectors.
Figure 2B:
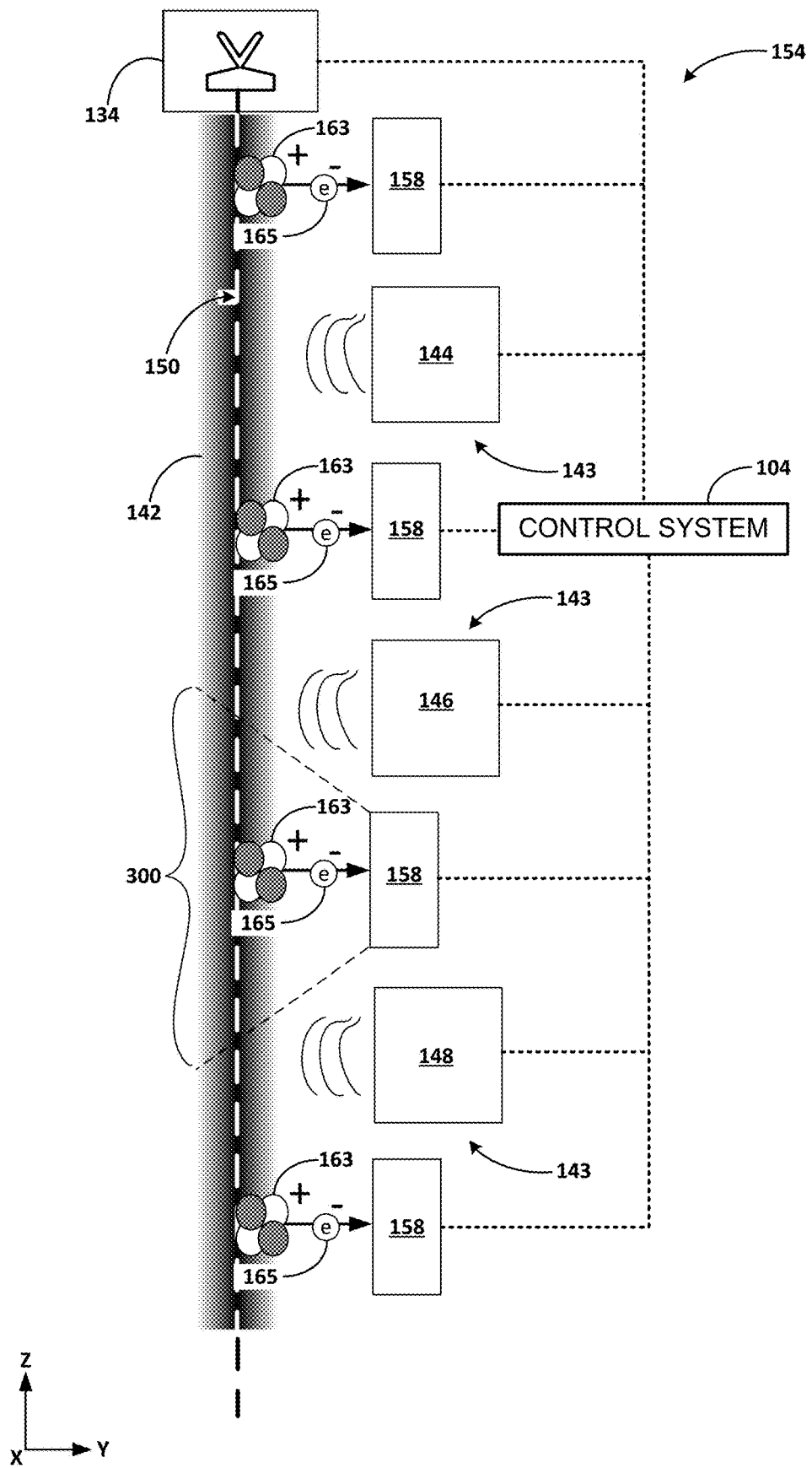

Referring now to FIGS. 2A and 2B, an exemplary beam monitoring systems 154 will be further described. As shown in FIGS. 2A and 2B, a beam monitoring system 154 may include one or more gaseous ionization detectors 158 located about a beam column 145. One or more gaseous ionization detectors 158 may be disposed along a beam axis 150 at one or more locations upstream and/or downstream from one or more electrostatic lenses. For example, a gaseous ionization detector 158 may be disposed downstream from a focusing lens 146. The gaseous ionization detector 158 may be configured to detect elementary particles 165 (e.g., electrons and/or photons) from ionizing gas 161 ionized by a portion of the energy beam 142 at a location downstream from the one or more electrostatic lenses. For example, as shown in FIG. 2A, the gaseous ionization detector 158 may be configured to detect elementary particles 165 from a location downstream from the focusing lens 146.

Additionally or in the alternative, a gaseous ionization detector 158 may be disposed upstream from one or more electrostatic lenses. For example, as shown in FIG. 2A, a gaseous ionization detector 158 may be disposed upstream from a deflection lens 148. The gaseous ionization detector 158 may be configured to detect elementary particles 165 (e.g., electrons and/or photons) from ionizing gas 161 ionized by a portion of the energy beam 142 at a location upstream from the one or more electrostatic lenses. For example, as shown in FIG. 2A, the gaseous ionization detector 158 may be configured to detect elementary particles 165 from a location upstream from the deflection lens 148.

As shown in FIG. 2B, an exemplary beam monitoring systems 154 may include a plurality of gaseous ionization detectors 158 respectively disposed at one or more of a plurality of locations along a beam column 145. For example, one or more gaseous ionization detectors 158 may be disposed upstream from an astigmatism lens 144. Additionally, or in the alternative, one or more gaseous ionization detectors 158 may be disposed downstream from an astigmatism lens 144 and/or upstream from a focusing lens 146. Further additionally, or in the alternative, one or more gaseous ionization detectors 158 may be disposed downstream from a focusing lens 146 and/or upstream from a deflection lens 148. Yet further additionally, or in the alternative, one or more gaseous ionization detectors 158 may be disposed downstream a deflection lens 148.

Regardless of where one or more gaseous ionization detectors 158 may be located, the control system 104 may be configured to determine one or more irradiation parameters from the elementary particles 165 detected by the respective gaseous ionization detector 158. For example, the control system 104 may be configured to determine one or more beam properties of an energy beam 142 at a location adjacent to the gaseous ionization detector 158 that detected the elementary particles 165. In some embodiments, the location of the energy beam 142 may correspond to a location along the beam column 145.

Referring to FIGS. 1, 2A, and 2B, the control system 104 may be configured to control one or more operations of an additive manufacturing machine 102 based at least in part on data from one or more gaseous ionization detectors 158. For example, the control system 104 may be configured to control one or more operations of an energy beam system and/or one or more operations of a beam monitoring system 154. Additionally, or in the alternative, the control system 104 may be configured to control one or more properties of an energy beam 142 based at least in part on data from one or more gaseous ionization detectors 158.

In some embodiments, the control system 104 may be configured to control a beam source 134, such as an electron beam generator, based at least in part on data from one or more gaseous ionization detectors 158. The control system 104 may be configured to control a cathode 136, an anode 138, and/or a filament 140 of a beam source 134. For example, the control system 104 may be configured to control thermionic emission of the beam source 134 based at least in part on data from one or more gaseous ionization detectors 158. In some embodiments, the control system 104 may be configured to control a voltage difference between the cathode 136 and the anode 138, so as to provide an energy beam 142, based at least in part on data from one or more gaseous ionization detectors 158.

Additionally, or in the alternative, the control system 104 may be configured to control one or more electrostatic lenses based at least in part on data from one or more gaseous ionization detectors 158. Exemplary electrostatic lenses, such as an astigmatism lens 144, a focusing lens 146, and/or a deflection lens 148, may be configured to control one or more irradiation parameters, such as one or more beam properties of an energy beam 142, at least in part by varying an intensity of an electrostatic field provided by the electrostatic lens. By way of example, an electrostatic lens may be configured as a magnetic lens that includes a quadrupole or higher order multipole arrangement. The electrostatic field may be varied with respect to discrete ones of the quadrupoles or multipole moments to augment one or more irradiation parameters, such as one or more beam properties of the energy beam 142.

For example, the control system 104 may be configured to control an astigmatism lens 144, such as to conform an energy beam 142 about a beam axis 150. In some embodiments, the control system 104 may be configured to determine a spherical aberration, such as an astigmatism, of an energy beam 142, and/or a degree of aberration or astigmatism of an energy beam 142. For example, the control system 104 may be configured to correct a spherical aberration exhibited by the energy beam 142, based at least in part on data from one or more gaseous ionization detectors 158. The control system 104 may be configured to control the astigmatism lens 144 based at least in part on a spherical aberration, such as an astigmatism, and/or the data from one or more gaseous ionization detectors 158, such as data corresponding to a cross-sectional beam profile of an energy beam 142.

As another example, the control system 104 may be configured to determine a cross-sectional beam profile, based at least in part on data from one or more gaseous ionization detectors 158. For example, the control system 104 may be configured to determine a symmetric or asymmetric cross-sectional beam profile of an energy beam 142, and/or a degree of symmetry or asymmetry of an energy beam 142. The control system 104 may be configured to control the astigmatism lens 144 based at least in part on the cross-sectional beam profile and/or the data from one or more gaseous ionization detectors 158, such as data corresponding to a cross-sectional beam profile of an energy beam 142.

In some embodiments, the control system 104 may be configured to cause the energy beam 142 to exhibit a desires cross-sectional beam profile with respect to the beam axis 150, such as a symmetric or asymmetric cross-sectional beam profile, and/or a cross-sectional beam profile with a desired degree of symmetry or asymmetry. Further additionally or in the alternative, control system 104 may be configured to cause the astigmatism lens 144 to augment the energy beam 142 with respect to one or more meridional planes that include the beam axis 150, such as a sagittal plane and/or a tangential plane. The control system 104 may be configured to augment one or more foci along the beam axis 150, such as a sagittal focus and/or a transverse focus.

In addition or in the alternative to controlling an astigmatic lens 144, the control system 104 may be configured to control a focusing lens 146 based at least in part on data from one or more gaseous ionization detectors 158. For example, the control system 104 may be configured to determine a focal point 152 of the energy beam 142. The control system 104 may be configured to conform the energy beam 142 to a desired focal point 152, and/or to collimate the energy beam 142, based at least in part on the determined focal point 152 and/or on data from one or more gaseous ionization detectors 158.

Additionally, or in the alternative, the control system 104 may be configured to control a deflection lens 148 based at least in part on data from one or more gaseous ionization detectors 158. For example, the control system 104 may be configured to cause the deflection lens 148 to deflect the energy beam 142 to a desired location of the build plane 128 and/or to deflect the energy beam 142 along an irradiation path, to selectively irradiate a portion of the build plane 128.

Referring now to FIGS. 3A-3F, exemplary configurations and arrangements of gaseous ionization detectors 158 with respect to a beam column 145 will be further described. As shown, for example, in FIGS. 3A-3D, an energy beam system 132 and/or a beam monitoring system 154 may include one or more gaseous ionization detectors 158 disposed about one or more circumferential positions of a beam column 145. In some embodiments, the one or more gaseous ionization detectors 158 may be insertable into a receptacle defined by the beam column 145. Additionally, or in the alternative, one or more gaseous ionization detectors 158 may define at least a portion of a beam column 145. For example, portions of a beam column 145 and one or more gaseous ionization detectors 158 may be coupled to one another. The one or more gaseous ionization detectors 158 may be disposed annularly or semiannuarly about a beam column 145. As shown in FIG. 3A, a gaseous ionization detector 158 may be located at any desired annular position of a beam column 145. An energy beam system 132 may include at least one gaseous ionization detector 158.

Respective ones of the gaseous ionization detectors 158 may have a field of regard 300 that encompasses at least a portion of the beam column 145. The field of regard 300 may have any desired orientation with respect to the beam column 145. For example, as shown in FIG. 3A, a gaseous ionization detector 158 may have a field of regard 300 with a cross-sectional aspect oriented transverse to a beam axis 150. Additionally, or in the alternative, as shown, for example, in FIG. 2B, a gaseous ionization detector 158 may have a field of regard 300 with a longitudinal aspect oriented perpendicular to a beam axis 150. The field of regard 300 may be configured to allow a gaseous ionization detector 158 to obtain data suitable for determining a one, two, and/or three-dimensional spatial representation of an energy beam 142. A spatial representation refers to a representation of a one, two, or three-dimensional space occupied by an energy beam 142. The spatial representation may correspond to an instant or interval in time. Additionally, or in the alternative, the field of regard 300 may be configured to allow a gaseous ionization detector 158 to obtain data suitable for determining a time-varying representation of an energy beam 142. A time varying representation refers to a representation of how one or more properties of an energy beam change over time.

In some embodiments, a spatial and/or time-based representation of an energy beam 142 may be determined from data obtained form an individual gaseous ionization detector 158. Additionally, or in the alternative, a spatial and/or time-based representation of an energy beam 142 may be determined from data obtained from a plurality of gaseous ionization detectors 158. For example, data from a plurality of gaseous ionization detectors 158 may be at least partially combined.

As shown in FIGS. 3B-3D, a beam monitoring system 154 may include a plurality of gaseous ionization detectors 158 disposed circumferentially about a beam column 145, such as at a corresponding plurality of annular position about a beam column 145. For example, as shown in FIG. 3B, a beam monitoring system 154 may include first gaseous ionization detector 158 and a second gaseous ionization detector 158 oriented transverse to one another, such as perpendicular to one another. The first gaseous ionization detector 158 may have a first field of regard 300 and the second gaseous ionization detector 158 may have a second field of regard 300, with the first field of regard 300 and the second field of regard 300 transecting one another and/or oriented transverse to one another. Additionally, or in the alternative, as shown, for example, in FIG. 3C, a beam monitoring system 154 may include at least three gaseous ionization detectors 158 oriented at corresponding transverse annular position about a beam column 145. The at least three gaseous ionization detectors 158 may provide respective fields of regard 300 that transect one another in a manner suitable for determining a triangular representation of an energy beam 142, such as a triangular spatial representation and/or a triangular time-varying representation of an energy beam 142.

In some embodiments, the number of gaseous ionization detectors 158 disposed annularly or circumferentially about a beam column 145 may correspond to the number of poles in a multipole moments of an electrostatic lens. Respective ones of a plurality of gaseous ionization detectors 158 may be oriented at respective annular and/or circumferential locations about a beam column 145 corresponding to respective poles of a multipole electrostatic lens. For example, in some embodiments, an electrostatic lens may provide a quadrupole moment, and, as shown in FIG. 3D, a beam monitoring system 154 may include four gaseous ionization detectors 158 oriented at annular position about a beam column 145 corresponding to the respective ones of the quadrupoles. Any number of multipole moments and any number gaseous ionization detectors 158 may be provided. For example, the number of gaseous ionization detectors 158 may correspond 1:1 to the number of poles provided by a multipole electrostatic lens. As another example, the number of gaseous ionization detectors 158 may correspond to the number of poles provided by a multipole electrostatic lens by a ratio of 1:2.

In some embodiments, as shown in FIGS. 3E and 3F, a beam monitoring system 154 may include one or more gaseous ionization detectors 158 disposed circumferentially about all or a portion of a circumference of a beam column 145. A gaseous ionization detector 158 that circumferentially occupies all or a portion of a circumference of a beam column 145 may provide a field of regard 300 that circumferentially surrounds all or a portion of an energy beam 142. For example, as shown in FIG. 3E, a gaseous ionization detector 158 may have an annular configuration. A gaseous ionization detector 158 that circumferentially surround all or a portion of a beam column 145 may provide data suitable for determining a three-dimensional spatial representation of an energy beam 142 and/or a time-based representation of the energy beam 142.

Figure 4B:
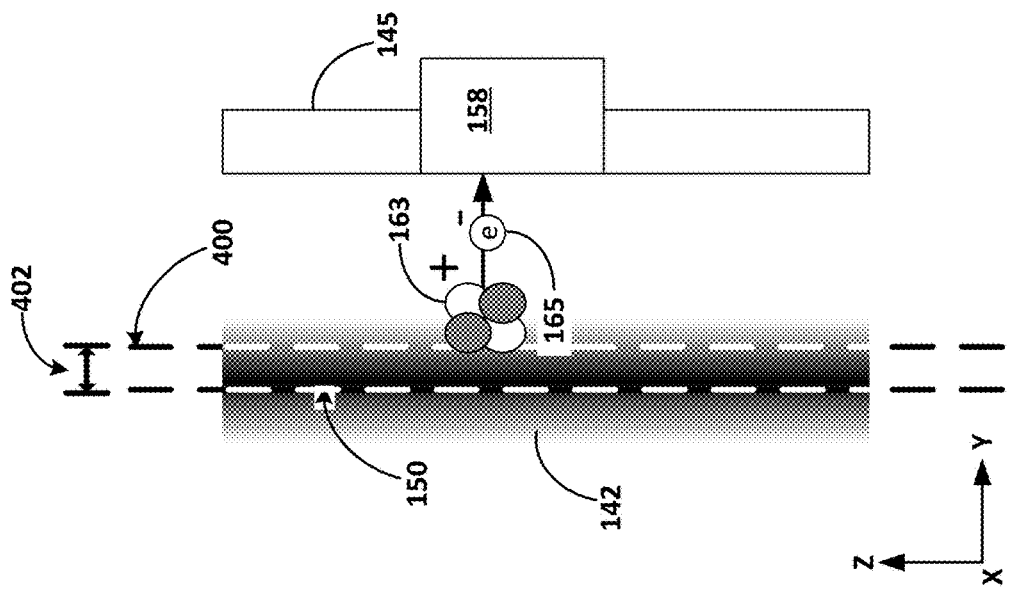
FIGS. 4A-4F schematically depict exemplary irradiation parameters being determined from ionized gas detected by a gaseous ionization detector.
Figure 4A:
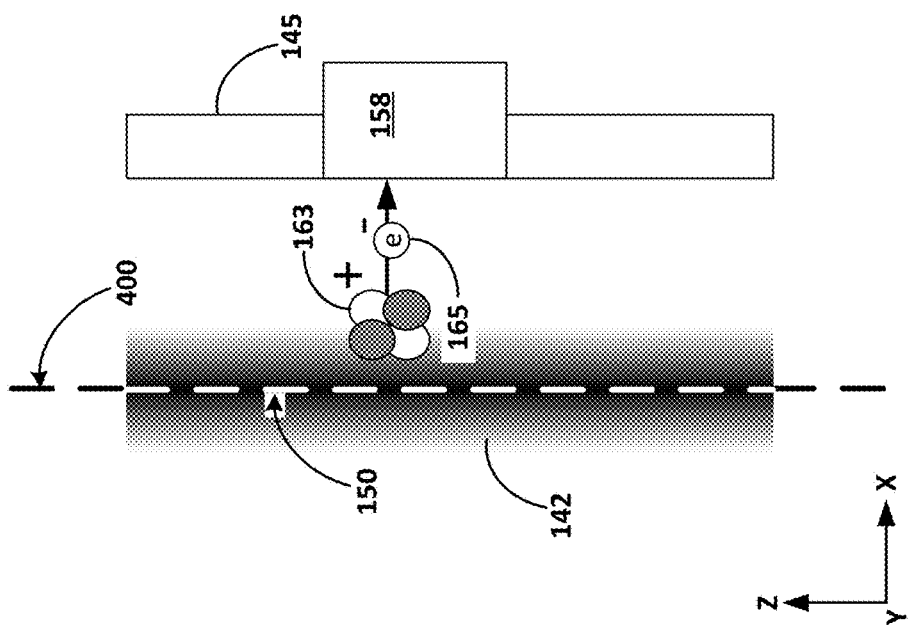

Referring now to FIGS. 4A-4F, exemplary irradiation parameters, such as beam properties, that may be determined using one or more gaseous ionization detectors 158 of a beam monitoring system 154 will be described. As shown in FIGS. 4A and 4B, one or more gaseous ionization detectors 158 may be utilized to determine an alignment or misalignment of an energy beam 142 with respect to a longitudinal axis 400 of a beam column 145. FIG. 4A shows an energy beam 142 with a beam axis 150 exhibiting an alignment with a longitudinal axis 400 of a beam column 145. FIG. 4B shows an energy beam 142 with a beam axis 150 exhibiting a misalignment with the longitudinal axis 400 of a beam column 145. In some embodiments, data from one or more gaseous ionization detectors 158 may be utilized to determine an offset 402 as between a beam axis 150 of an energy beam 142 and a longitudinal axis 400 of a beam column 145. Additionally, or in the alternative, data from one or more gaseous ionization detectors 158 may be utilized to determine a centricity of an energy beam 142 with respect to a beam axis 150 and/or with respect to a longitudinal axis 400 of a beam column 145. An alignment, misalignment, and/or centricity of an energy beam 142 may be determined with reference to an energy beam 142 at any location along a beam column 145, including, for example, prior to, during, and/or after passing one or more electrostatic lenses, such as an astigmatism lens 144, a focusing lens 146, and/or a deflection lens 148.

Figure 4D:
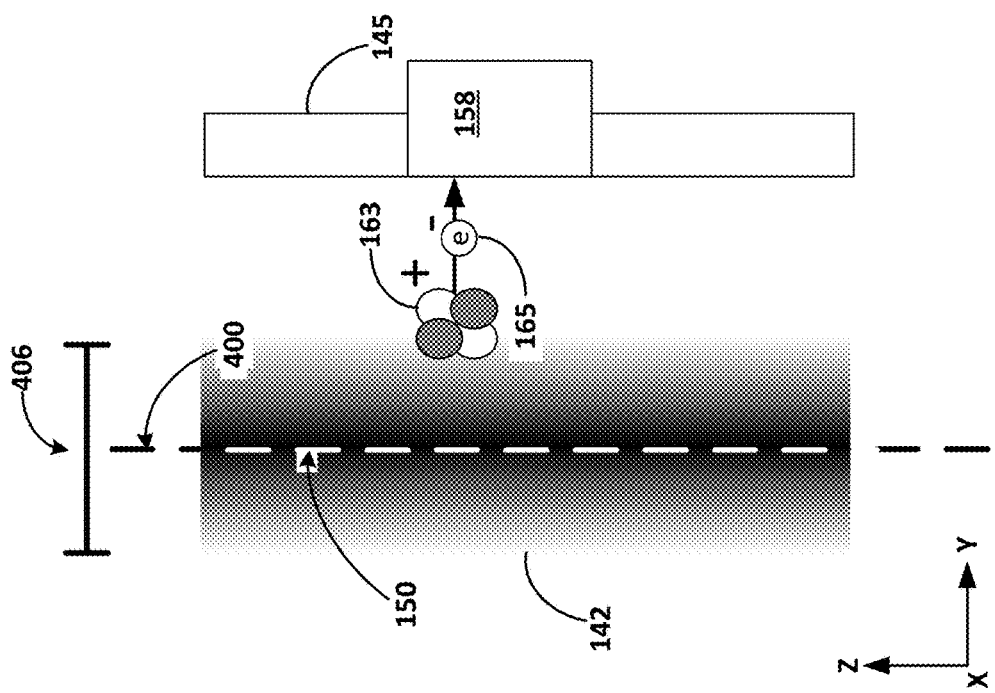
Figure 4C:
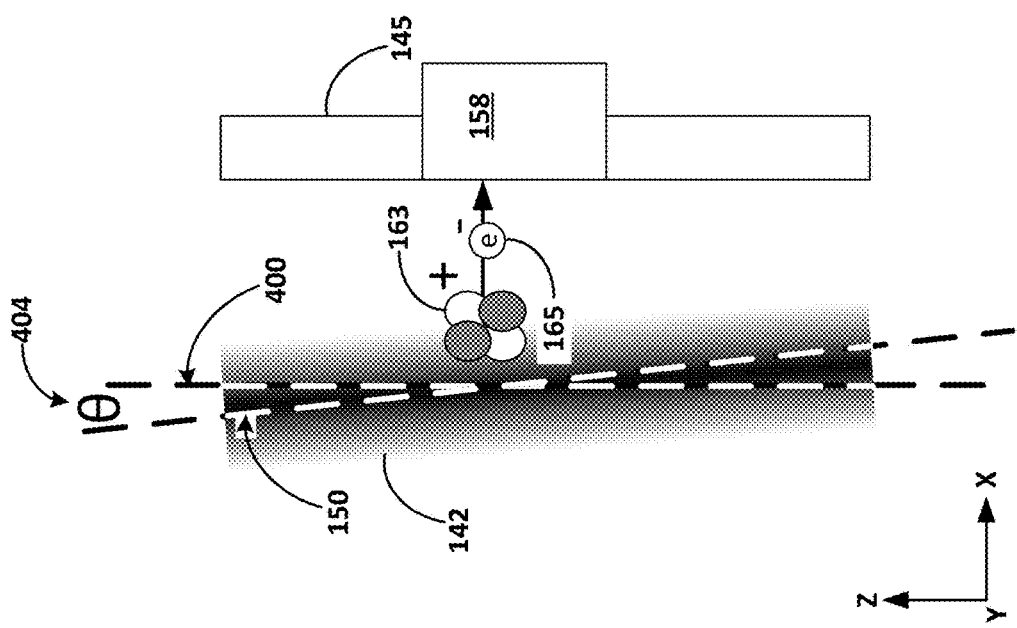

As shown in FIG. 4C, in some embodiments, data from one or more gaseous ionization detectors 158 may be utilized to determine an inclination angle 404 of an energy beam 142. For example, an inclination angle 404 may be determined with reference to a longitudinal axis 400 of a beam column 145 and/or with reference to a build plane 128. An inclination angle 404 may be determined with reference to an energy beam 142 at any location along a beam column 145, including, for example, an inclination angle of an energy beam 142 prior to, during, and/or after passing a deflection lens 148. Additionally, or in the alternative, an inclination angle 404 may be determined with reference to an energy beam 142 prior to, during, and/or after passing an astigmatism lens 144 and/or a focusing lens 146.

As shown in FIG. 4D, in some embodiments, data from one or more gaseous ionization detectors 158 may be utilized to determine a cross-sectional dimension 406 of an energy beam 142, such as a cross-sectional width and/or a cross-sectional area of an energy beam. A cross-sectional dimension 406 of an energy beam 142 may be determined with reference to an energy beam 142 at any location along a beam column 145, including, for example, prior to, during, and/or after passing one or more electrostatic lenses, such as an astigmatism lens 144, a focusing lens 146, and/or a deflection lens 148. A cross-sectional dimension of an energy beam 142 may be determined with reference to an energy beam 142 at any location along a beam column 145, including, for example, prior to, during, and/or after passing one or more electrostatic lenses, such as an astigmatism lens 144, a focusing lens 146, and/or a deflection lens 148.

Figure 4F:
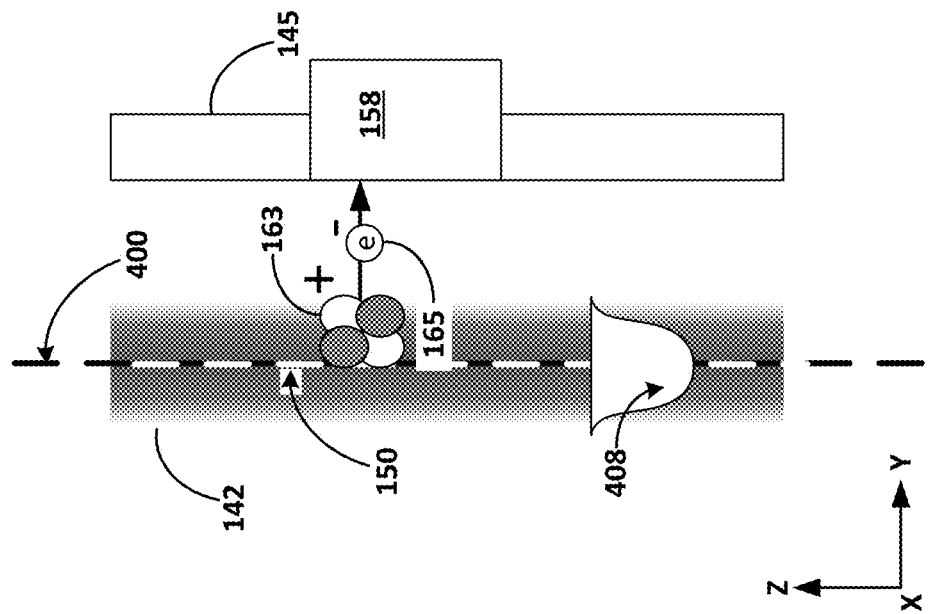
Figure 4E:
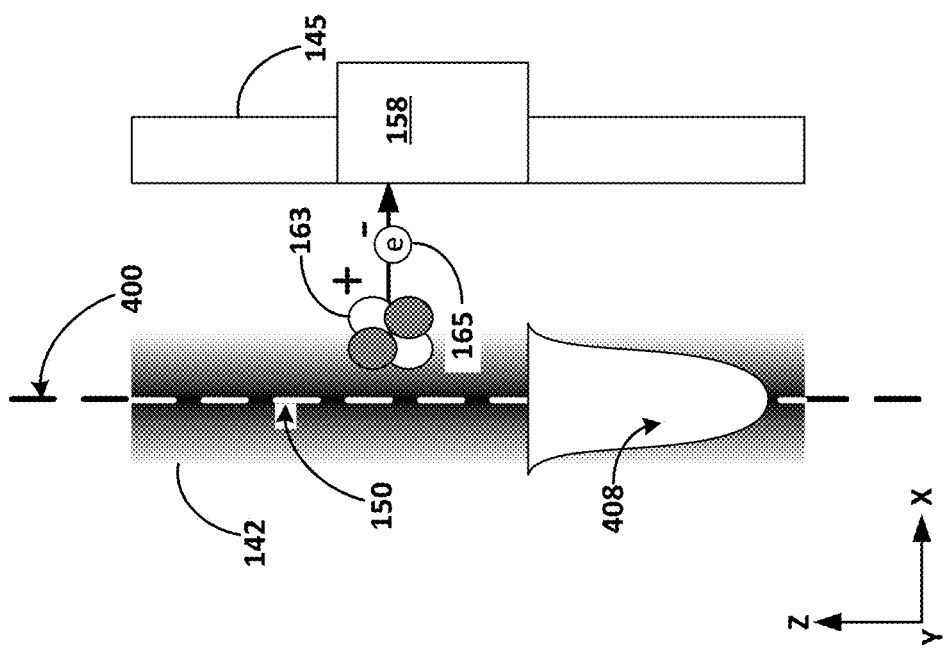

As shown in FIGS. 4E and 4F, in some embodiments, data from one or more gaseous ionization detectors 158 may be utilized to determine a beam profile 408 with respect to one or more properties of an energy beam 142. For example, one or more gaseous ionization detectors 158 may be utilized to determine an intensity profile of an energy beam. By way of example, FIG. 4E shows an energy beam 142 with a first beam profile 408 with respect to a beam property, such as intensity, having a first magnitude, and FIG. 4F shows an energy beam 142 with a second beam profile 408 with respect to the beam property, such as intensity, having a second magnitude, with the first magnitude being greater than the second magnitude. A beam profile 408 may include a two-dimensional and/or a three-dimensional distribution of one or more properties of an energy beam, such as a two-dimensional intensity profile or a three-dimensional intensity profile. Additionally, or in the alternative, data from one or more gaseous ionization detectors 158 may be utilized to determine one or more parameters pertaining to a beam profile 408, such as a full-width-at-half-maximum and/or a full-area-at-half-maximum. As used herein, the term full-width-at-half-maximum refers to the full width of an energy beam 142 at one-half of a maximum value of a irradiation parameter, such as beam intensity. As used herein, the term full-area-at-half-maximum refers to the full cross-sectional area of an energy beam 142 at one-half of a maximum value of a irradiation parameter, such as beam intensity. A beam profile and/or a parameter pertaining to a beam profile may be determined with reference to an energy beam 142 at any location along a beam column 145, including, for example, prior to, during, and/or after passing one or more electrostatic lenses, such as an astigmatism lens 144, a focusing lens 146, and/or a deflection lens 148.

Figure 5A:
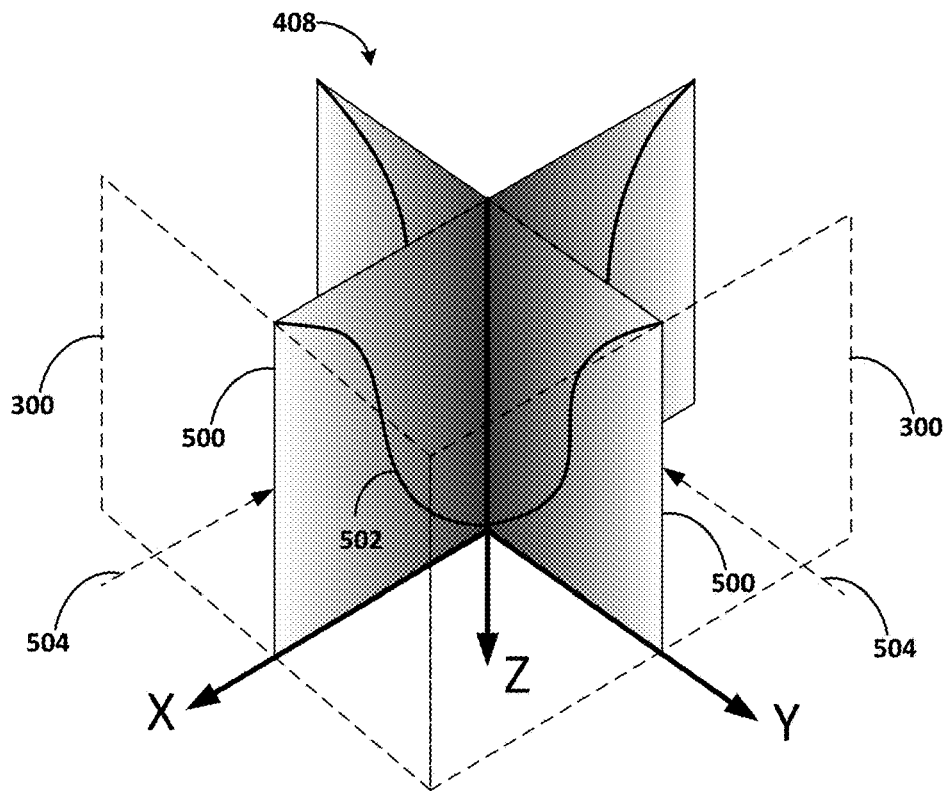
FIGS. 5A and 5B schematically depict exemplary energy beam profiles that may be determined using a gaseous ionization detector.
Figure 5B:
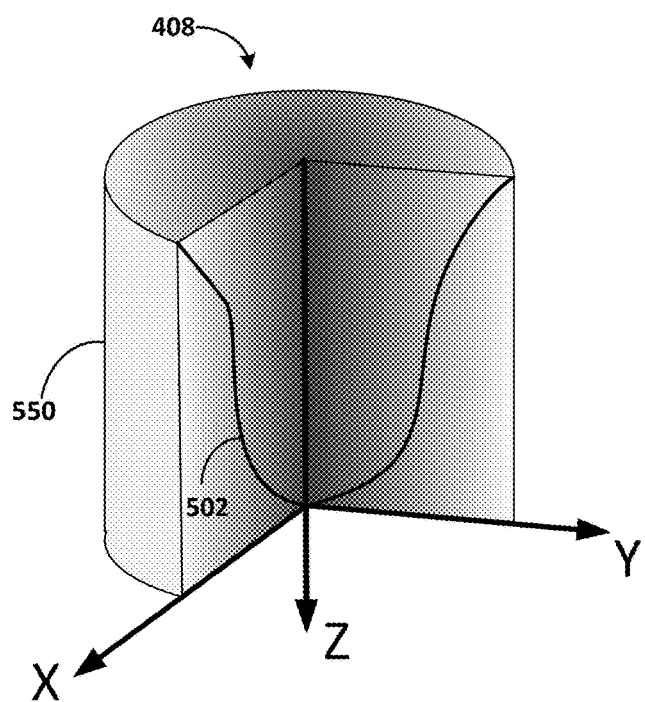

Referring now to FIGS. 5A and 5B, exemplary beam profiles 408 will be described. As shown in FIGS. 5A, data from one or more gaseous ionization detectors 158 may be utilized to determine a beam profile 408 with respect to one or more beam planes 500, such as a plurality of beam planes 500. The one or more beam planes 500 may respectively include a beam axis 150 and/or a longitudinal axis 400 of a beam column 145. Additionally, or in the alternative, the one or more beam planes 500 may respectively transect a beam axis 150 and/or a longitudinal axis 400 of a beam column 145. The one or more beam planes 500 may transect one another. Additionally, or in the alternative, the one or more beam planes 500 may be perpendicular to one another.

By way of example, FIG. 5A shows an exemplary beam profile 408 determined with respect to a first beam plane 500 and a second beam plane 500. The first beam plane 500 may transect the second beam plane 500. The first beam plane may include a first irradiation parameter distribution 502 and the second beam plane 500 may include a second irradiation parameter distribution 502. The first beam plane 500 and/or the first irradiation parameter distribution 502 may be determined from data obtained at least in part from a first gaseous ionization detector 158. Additionally, or in the alternative, the second beam plane 500 and/or the second irradiation parameter distribution 502 may be determined from data obtained at least in part from a second gaseous ionization detector 158. The first and second gaseous ionization detector 158 may respectively include a field of regard 300 that transects one another. The first and second fields of regard 300 may respectively include an axis of regard 504. The first beam plane 500 may be normal to the first axis of regard. The second beam plane 500 may be normal to the second axis of regard.

In some embodiments, a three-dimensional beam profile 408 may be determined from a plurality of two-dimensional beam profiles 408, such as from a first two-dimensional beam profile 408 corresponding to a first beam plane 500 and a second two-dimensional beam profile 408 corresponding to a second beam plane 500. Additionally, or in the alternative, a three-dimensional bam parameter distribution 502 may be determined from a plurality of two-dimensional irradiation parameter distributions, such as from a first two-dimensional irradiation parameter distribution 502 corresponding to a first beam plane 500 and a second two-dimensional irradiation parameter distribution 502 corresponding to a second beam plane 500. In some embodiments, one or more irradiation parameters may be extrapolated, such as into a three-dimensional space, from one or more two-dimensional beam profiles 408.

As another example, FIG. 5B shows an exemplary beam profile 408 determined with respect to a three-dimensional beam domain 550. The three-dimensional beam domain 550 may include a irradiation parameter distribution 502 with respect to one or more irradiation parameters. The three-dimensional beam domain 550 may be determined from one or more gaseous ionization detectors 158. For example, a three-dimensional beam domain 550 may be determined from one or more gaseous ionization detectors 158 that circumferentially surround all or a portion of a beam column 145. Additionally, or in the alternative, a three-dimensional beam domain 550 may be determined from a plurality of gaseous ionization detectors 158 disposed semiannularly about the circumference of a beam column 145.

Exemplary irradiation parameters that may be determined, based at least in part on data from one or more gaseous ionization detectors 158, include energy, energy distribution, current, current distribution, power (e.g., energy×current), power distribution, intensity (e.g., energy per unit area), intensity distribution, energy density (e.g., energy×current per unit area), current density, bunch length, emittance, longitudinal emittance, transverse emittance, energy spread, spot size, spot shape, convergence, depth of field, focal point, filament saturation, alignment, and the like.

Now referring to FIGS. 6A and 6B, exemplary gaseous ionization detectors 158 will be described. A gaseous ionization detector 158 may be configured to detect any one or more elementary particles 165 (e.g., electrons and/or photons), and/or ionized gas 163. A gaseous ionization detector 158 may include one or more particle multipliers, such as one or more microchannel plates, dynodes, photomultipliers, electron multipliers, micropattern gaseous detectors, micromegas detectors, single particle multipliers, or the like, as well as combinations of these. Exemplary dynodes include reflective dynodes, transmissive dynodes, as well as combinations of these.

Exemplary gaseous ionization detectors 158 may include one or more secondary particle emission materials configured to emit multiple secondary particles as a result of a single charged particle being incident thereon. Secondary particle emission materials may include electron emission materials and photon emission materials. Electron emission materials may emit electrons as a result of charged particles being incident thereon. Photon emission materials may emit photons as a result of charged particles being incident thereon. Exemplary particle emission materials may include particle transmission materials and/or particle reflection materials. Particle transmission materials may be configured to emit particles through a transmission configuration. Particle reflection materials may be configured to emit particles through a reflection configuration. Exemplary gaseous ionization detectors 158 may exhibit a gain from secondary particle emission (e.g., through reflection or transmission) of from about $1 \times 10^3$ to about $1 \times 10^7$, such as form about $1 \times 10^3$ to about $1 \times 10^5$, such as from about $1 \times 10^5$ to about $1 \times 10^7$.

Figure 7A:
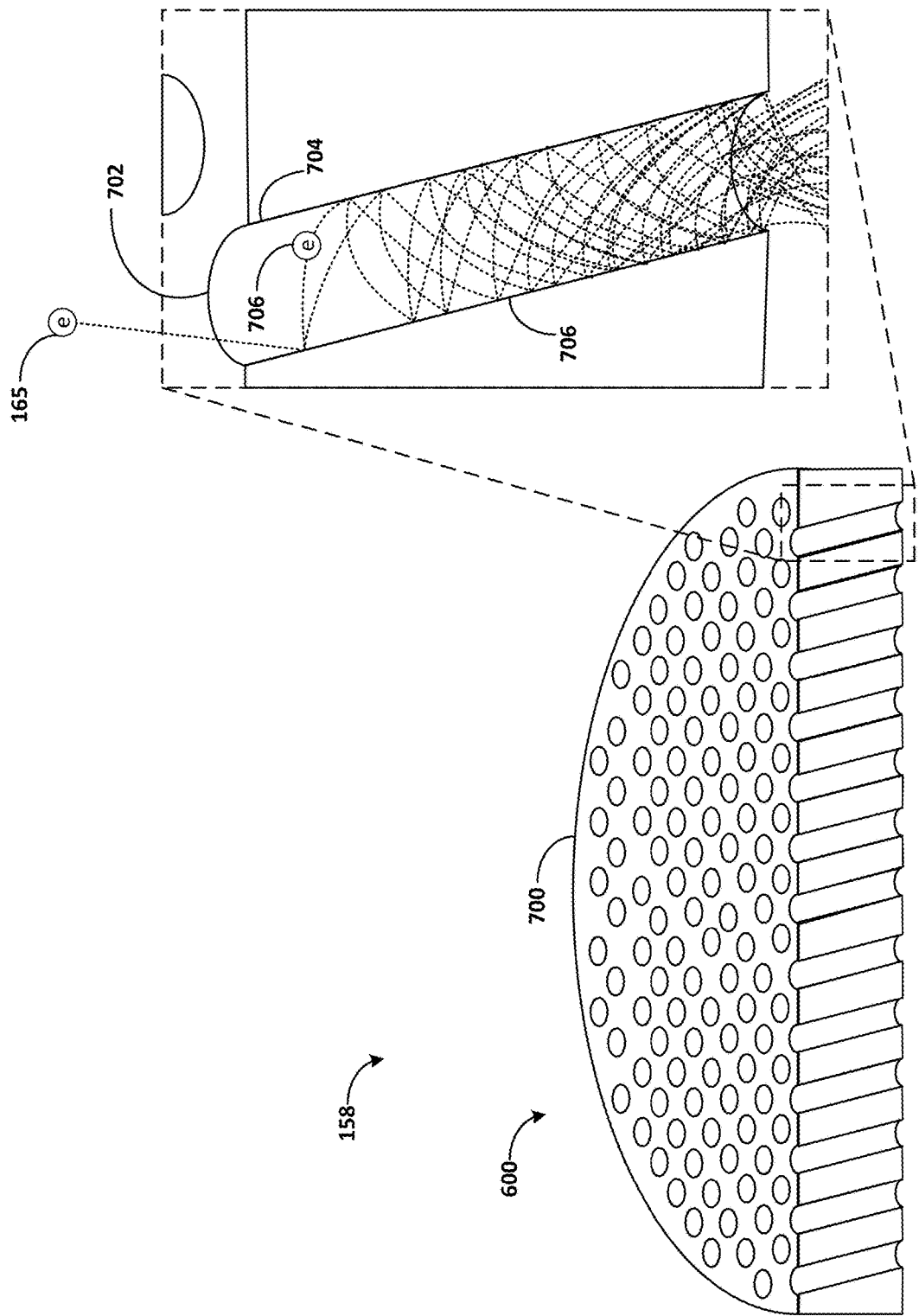
FIGS. 7A-7C schematically depict exemplary particle multipliers that may be included in a gaseous ionization detector.

Exemplary gaseous ionization detectors 158 may include a microchannel plate. FIG. 7A shows an exemplary microchannel plate 700. A microchannel plate 700 may sometimes be referred to as an MCP. An exemplary microchannel plate 700 may include an array of electron multiplier channels 702 that respectively act as a reflective electron multiplier or a continuous dynode chain. The electron multiplier channels 702 may include a secondary electron emission material 704. As elementary particles 165, such as electrons, become incident upon the secondary electron emission material 704, the secondary electron emission material 704 emit multiple secondary electrons 706. These secondary electrons 706 become incident upon the secondary electron emission material 704, in turn, releasing further secondary electrons 706.

A gaseous ionization detector 158 that includes a microchannel plate 700 may provide a compact channel structure with good spatial resolution, good time resolution, and good robustness to magnetic fields. A microchannel plate 700 may include a plurality of plates with an alternating bias angle to suppress ion feedback. For example, two plates may be stacked in a "chevron" configuration. As another example, three plates may be stacked in a "zigzag" configuration. Additionally, or in the alternative, a microchannel plate 700 may include curved channels to suppress ion feedback.

An exemplary gaseous ionization detector 158 may include a photomultiplier. A photomultiplier may sometimes be referred to as a PMT. Exemplary photomultipliers include silicon photomultipliers, and other solid state devices, configured to convert incident photons into an electric signal. Additionally, or in the alternative, a gaseous ionization detectors 158 may include a photomultiplier combined with a microchannel plate 700. A photomultiplier combined with a microchannel plate 700 may sometimes be referred to as an MCP-PMT. An MCP-PMT may likewise provide good spatial resolution, good time resolution, and good robustness to magnetic fields. In some embodiments, an MCP-PMT may be particularly suitable for use with magnetic fields generated by electrostatic lenses 143 disposed about a beam column 145. For example, an MCP-PMT may be located in close proximity to a electrostatic lens 143 and/or a beam source 134, and/or magnetic fields associated therewith, while still providing good spatial resolution, good time resolution, and good robustness to the magnetic fields from the electrostatic lens 143.

Another exemplary gaseous ionization detectors 158 may include a micropattern gaseous detector. A micropattern gaseous detector may sometimes be referred to as an MPGD. Exemplary micropattern gaseous detectors include micromegas detectors and gas electron multipliers. Additionally, or in the alternative, an exemplary gaseous ionization detectors 158 may include a microchannel plate 700 combined with a micropattern gaseous detector. A microchannel plate 700 combined with a micropattern gaseous detector may sometimes be referred to as an MCP-MPGD. For example, an exemplary MCP-MPGD may include one or more microchannel plates 700 followed by one or more micropattern gaseous detectors, such as one or more micromegas detectors.

Still further exemplary gaseous ionization detectors 158 may include one or more transmissive dynodes. Additionally, or in the alternative, an exemplary gaseous ionization detectors 158 may include one or more transmissive dynodes combined with an electron emission membrane and/or a photomultiplier, such as a photocathode.

Exemplary gaseous ionization detectors 158 may exhibit enhanced robustness to magnetic fields by aligning the axis of the gaseous ionization detector 158 with the direction of a magnetic field exhibiting an influence on the gaseous ionization detector 158. Additionally, or in the alternative, a gaseous ionization detector 158 may exhibit enhanced robustness to magnetic fields by providing spatial separation between elements of the gaseous ionization detector 158. For example, in the case of a MCP-PMT, a photomultiplier element may be spatially separated from a microchannel plate 700 element. As another example, in the case of an MCP-MPGD, a micropattern gaseous detector element may be spatially separated from a microchannel plate 700 element. Additionally, or in the alternative, a gaseous ionization detector 158 may exhibit enhanced robustness to magnetic fields by utilizing microchannel plates 700 with electron multiplier channels 702 that have a small channel pore size. By way of example, a microchannel plate 700 may have electron multiplier channels 702 with a channel pore size of from about 1 micrometer (μm) to about 100 μm, such as from about 1 μm to about 50 μm, such as from about 5 μm to about 25 μm, such as from about 1 μm to about 10 μm.

An exemplary gaseous ionization detector 158 may provide good transit time and/or good transit time spread. An exemplary transit time may be from about 0.1 nanoseconds (ns) to about 100 ns, such as from about 0.5 ns to about 50 ns, or such as from about 0.5 ns to about 10 ns. An exemplary transit time spread may be from about 10 picoseconds (ps) to about 1,000 ps, such as from about 50 ps to about 500 ps, or such as from about 100 ps to about 1,000 ps.

As used herein, the term "transit time" refers to a time interval between an arrival of an incident particle (e.g., ions, photons, or other charged particles) at a gaseous ionization detector 158 to a to a corresponding pulse output by the gaseous ionization detector 158. The time interval may be determined from a pulse at a cathode element to a corresponding pulse at an anode element of the gaseous ionization detector 158. As used herein, the term "transit time spread" refers to the standard deviation of the probability distribution of transit-time fluctuations.

Referring again to FIGS. 6A and 6B, an exemplary gaseous ionization detector 158 may include one or more particle multipliers 600, such a one or more dynodes or other elements that include a secondary electron emission material 704. The one or more dynodes may include one or more reflective dynodes and/or one or more transmissive dynodes. A gaseous ionization detector 158 may include an window 602 and a sensor 604. Elementary particles 165 passing through the window 602 may proceed to the one or more particle multipliers 600. Secondary electrons 706 from the one or more particle multipliers 600 may become incident upon the sensor 604. The sensor 604 may include a charged coupled device (CCD), an active pixel sensor, such as a complementary metal-oxide-semiconductor active pixel sensor (CMOS), or the like.

As shown in FIG. 6B, in some embodiments, a gaseous ionization detector 158 may include a phosphor screen 606. Secondary electrons 706 from the one or more particle multipliers 600 may become incident upon the phosphor screen 606. The phosphor screen 606 may include a fluorescent or phosphorescent substance that emits photons when exposed to secondary electrons 706 or other elementary particles 165. The phosphor screen 606 may be coupled to the sensor 604 by a fiberoptic bundle 608 that includes bundle of fiberoptic elements. The photons may become incident upon the sensor 604, such as a CCD or CMOS, by way of the fiberoptic elements of the fiberoptic bundle 608. A space 610 defined between the window 602 and the sensor 604 may be under vacuum. Additionally, or in the alternative, a space 610 defined between the window 602 and the sensor 604 may include an ionizing gas, such as helium, neon, argon, krypton, and/or xenon. A power supply 612 may be operably coupled to the gaseous ionization detector 158. The power supply 612 may provide a voltage to respective elements of the gaseous ionization detector 158.

In some embodiments, a gaseous ionization detector 158 may include a secondary particle emission element 614. The secondary particle emission element may include a photon emission material and/or a secondary electron emission material 704. The secondary particle emission element 614 may be located upstream from the particle multipliers 600. Additionally, or in the alternative, a secondary particle emission element 614 may be located downstream from a particle multipliers 600. By way of example, a secondary particle emission element 614 may be configured as a photomultiplier. The photomultiplier may include a photon emission material. An exemplar photomultiplier may emit multiple photons as a result of a single particle incident thereon. An exemplary photomultiplier may include a phosphor screen. Exemplary phosphor screens may emit from about 10 to about 500 photons per electron, such as from about 10 to about 200 photons per electron, such as from about 100 to about 300 photons per electron.

Additionally, or in the alternative, a secondary particle emission element 614 may be configured as an electron multiplier. An exemplary electron multiplier may emit multiple electrons as a result of a single electron incident thereon. Generally, a secondary electron emission material 704 transforms high-energy, low current electrons into a low-energy, high-current secondary beam.

Figure 7B:
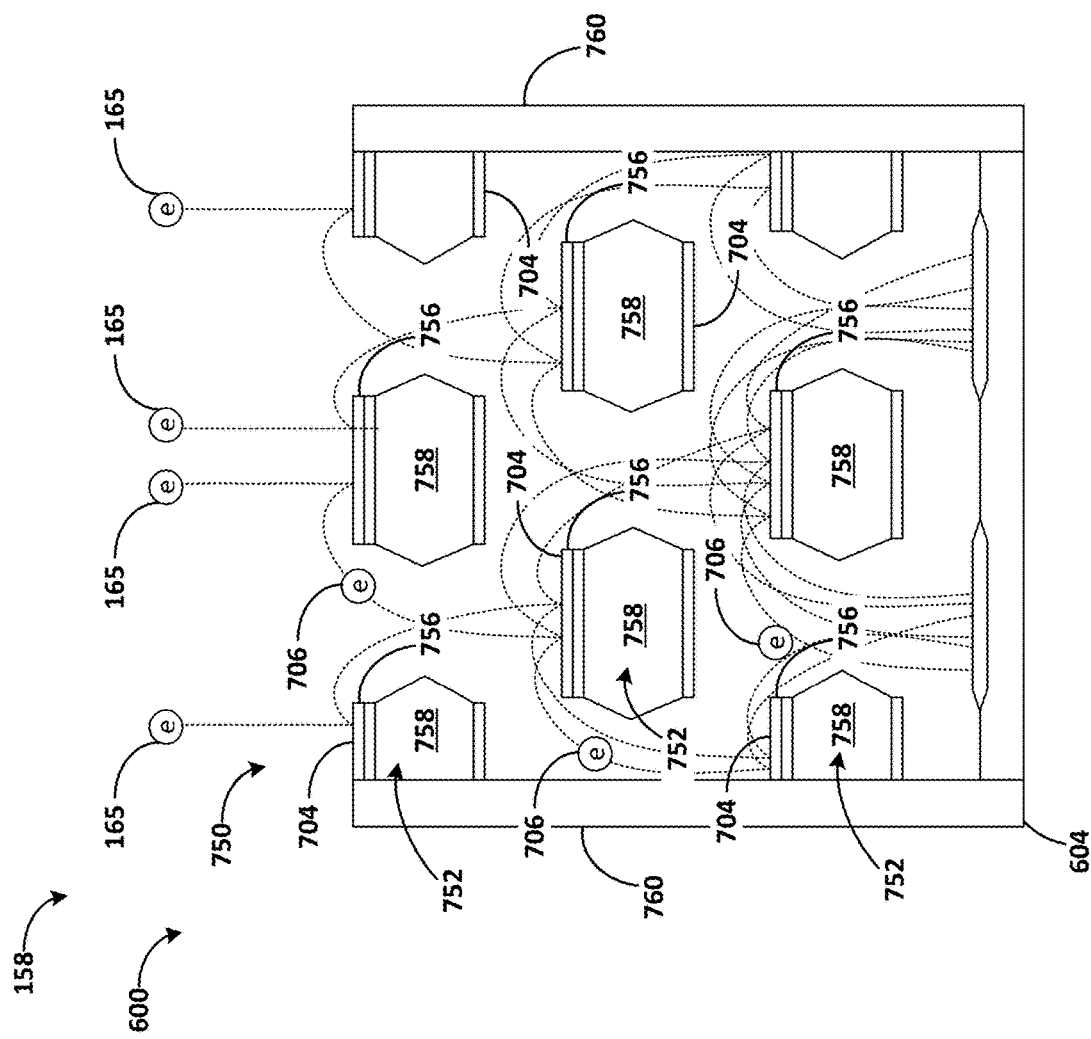
Figure 7C:
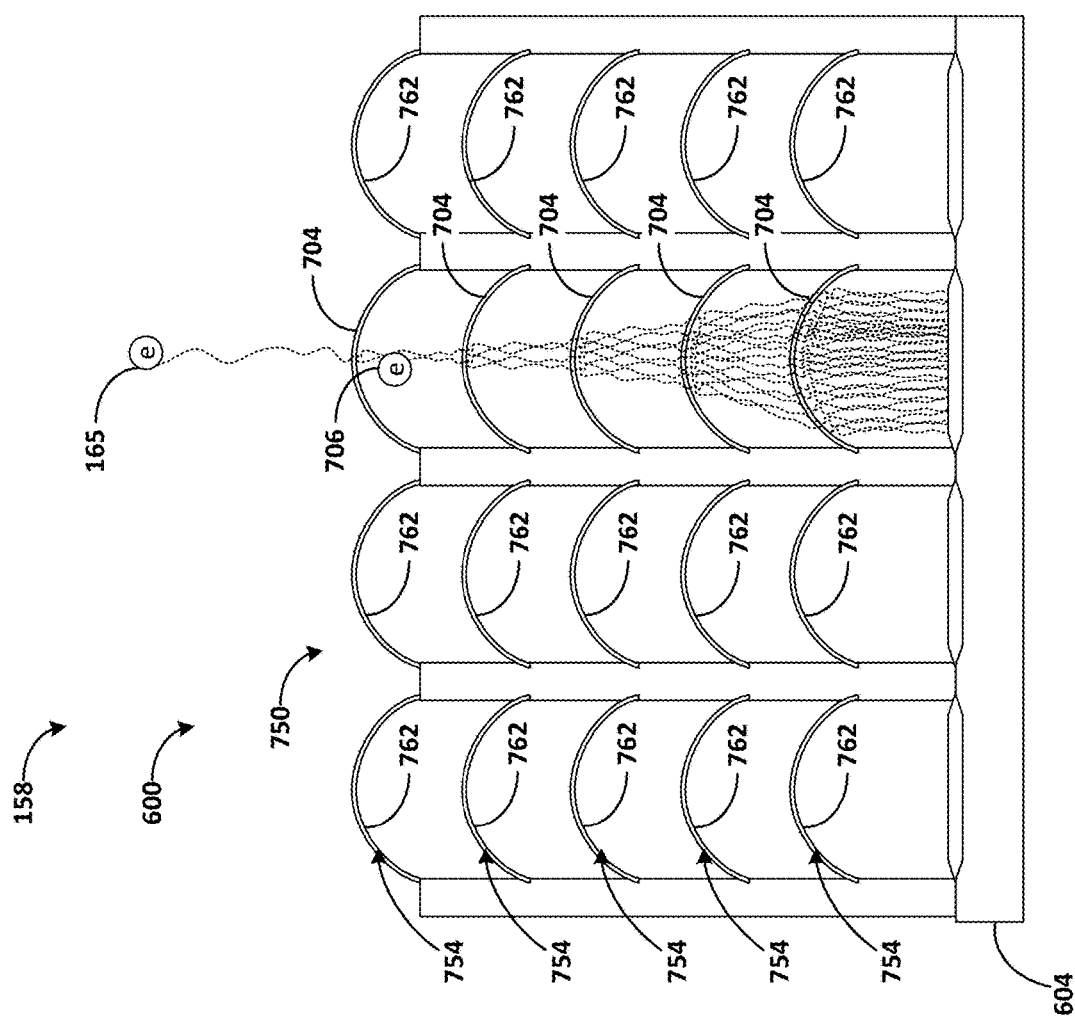

In some embodiments, a secondary electron emission element may include one or more microchannel plates 700, such as shown in FIG. 7A. Additionally, or in the alternative, as shown in FIGS. 7B and 7C, a secondary electron emission element may include an electron multiplier lattice 750. FIG. 7B shows an electron multiplier lattice 750 that includes a plurality of reflective electron multipliers 752. FIG. 7C shows an exemplary electron multiplier lattice 750 that includes a plurality of transmissive electron multipliers 754. In some embodiments, an electron multiplier lattice 750 may include a combination of one or more reflective electron multipliers 752 and one or more transmissive electron multipliers 754. Additionally, or in the alternative, an electron multiplier lattice 750 may include one or more microchannel plates 700, in combination with one or more reflective electron multipliers 752 and/or one or more transmissive electron multipliers 754.

As shown in FIG. 7B, an exemplary electron multiplier lattice 750 may include a plurality of reflective electron multipliers 752. The reflective electron multipliers 752 may include an array of reflective dynodes 756. The reflective dynodes 756 may be formed from a suitable secondary electron emission material 704. The secondary electron emission material 704 may be supported by a polymer substrate 758. The reflective dynodes 756 may be supported by insulating pillars 760.

As shown in FIG. 7C, an exemplary electron multiplier lattice 750 may include a plurality of transmissive electron multipliers 754. The transmissive electron multipliers 754 may include an array of transmissive dynodes 762. The transmissive dynodes 762 may be formed of a suitable secondary electron emission material 704. The transmissive dynodes 762 may be sufficiently thin to allow secondary electrons 706 to be emitted in a transmission configuration with sufficient gain from such emission of such secondary electrons 706. By way of example, the transmissive dynodes 762 may be from about 5 nanometers (nm) to about 100 nm thick, such as from about 10 nm to about 50 nm thick, such as from about 5 nm to about 20 nm thick. The transmissive dynodes 762 may be supported by insulating pillars 760.

Exemplary electron multiplier lattice 750 elements may be fabricated using semiconductor fabrication technology. In some embodiments, exemplary electron multiplier lattice 750 elements may be fabricated using photoresist technology, such as photolithography, photoengraving, or the like. Additionally, or in the alternative, exemplary electron multiplier lattice 750 elements may be fabricated using etching technology, such as dry etching, wet etching, atomic layer etching, or the like. Further additionally, or in the alternative, exemplary electron multiplier lattice 750 elements may be fabricated using chemical vapor deposition, atomic layer deposition, physical vapor deposition, molecular beam epitaxy, electrochemical deposition, chemical-mechanical polishing, or laser lift-off, as well as combinations of these.

In some embodiments, an electron multiplier lattice 750 may be sufficiently flexible to provide a curved gaseous ionization detector 158, such as a gaseous ionization detector 158 that occupies an annular or semi-annular portion of a beam column 145, as shown, for example, in FIGS. 3E and 3F. For example, in some embodiments, a gaseous ionization detector 158 may include one or more particle multipliers 600 that have a curved profile, one or more windows 602 that have a curved profile, one or more a sensors 604 that have a curved profile, one or more phosphor screens 606 that have a curved profile, and/or one or more secondary particle emission elements 614 that have a curved profile. In addition to a curved profile, other non-planar or curvilinear gaseous ionization detectors 158 and/or components thereof are also within the scope of the present disclosure.

Suitable secondary electron emission materials 704 for reflect may be selected based at least in part on a secondary electron yield of the material. As used herein, the term "secondary electron yield" refers to the ratio of the current of emitted secondary electrons to the current of the incident particles. Suitable secondary electron emission materials 704 for a reflective electron multiplier 752 may have a secondary electron yield of at least 1.0, such as from about 1.0 to about 25.0, such as from about 1.0 to about 10.0, such as from about 1.0 to about 5.0, such as from about 5.0 to about 15.0 Suitable secondary electron emission materials 704 for a transmissive electron multiplier 754 may have a secondary electron yield of at least 3.0, such as from about 3.0 to about 25.0, such as from about 3.0 to about 10.0, such as from about 3.0 to about 5.0, such as from about 5.0 to about 15.0.

Suitable secondary electron emission materials 704 may include beryllium oxide (BeO), gallium phosphide (GaP), gallium arsenide phosphide (GaAsP), aluminum oxide ($Al_2O_3$), magnesium oxide (MgO), or diamond, as well as combinations of these. Such materials may be coated onto a conducting substrate electrode, such as nickel, stainless steel, or beryllium copper (CuBe). Exemplary diamond materials may include diamond films, such as monocrystalline diamond films, polycrystalline diamond films, boron doped diamond films, hydrogenated diamond films, and the like. Further exemplary secondary electron emission materials 704 may include lithium fluoride (LiF), sodium fluoride (NaF), sodium chloride (NaCl), rubidium chloride (RbCl), caesium chloride (CsCl), sodium bromide (NaBr), potassium bromide (KBr), potassium iodide (KI), calcium fluoride ($CaF_2$), barium fluoride ($BaF_2$), magnesium oxide (MgO), barium (Ba), corundum ($Al_2O_3$), ruby ($Al_2O_3$:Cr), sapphire ($Al_2O_3$:Fe:Ti), spinel ($MgAl_2O_4$), aluminum beryllium alloy (Al—Be), nickel-chrome alloy (Ni—Cr), beryllium oxide (BeO), strontium oxide (SrO), as well as combinations of these. Secondary electron emission materials 704 may be applied to a substrate by atomic layer deposition, doping, or the like.

Figure 8:
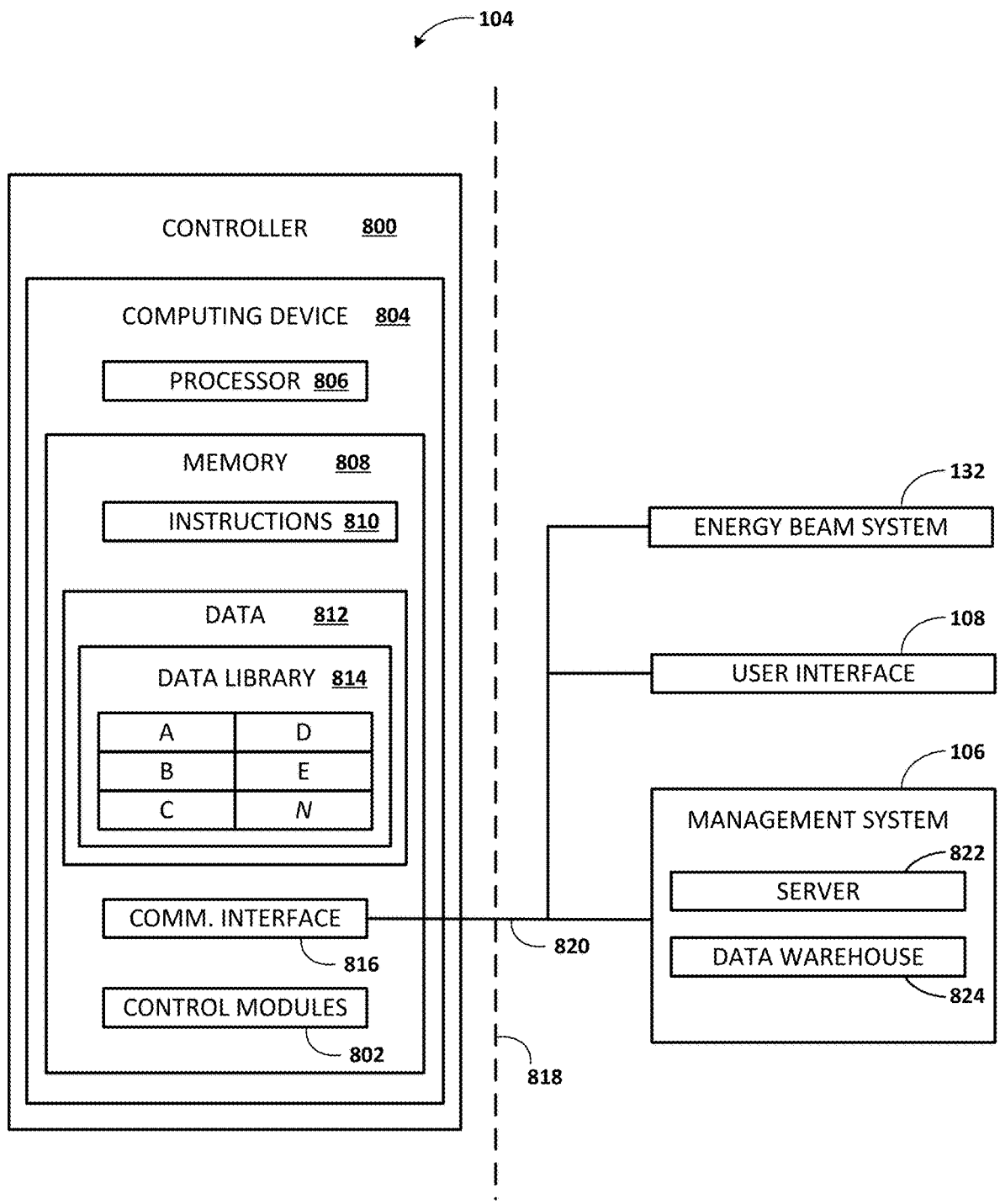
FIG. 8 schematically depicts an exemplary control system.

Now turning to FIG. 8, an exemplary control system 104 will be further described. A control system 104 may be configured to perform one or more control operations with respect to an additive manufacturing machine 102 or an additive manufacturing system 100, including, for example, one or more control operations with respect to an energy beam system 132 and/or various controllable components thereof. The control system 104 may be configured to output one or more control commands associated with an additive manufacturing machine 102 and/or an additive manufacturing system 100, including, for example, one or more control commands associated with an energy beam system 132 and/or various controllable components thereof. Exemplary control operation may be based at least in part on data from one or more gaseous ionization detectors 158.

Exemplary controllable components that may be controlled by a control command and/or a control operation may include any one or more components of an energy beam system 132, such as a beam source 134; one or more electrostatic lenses 143, such as an astigmatism lens 144, a focusing lens 146, and/or a deflection lens 148; a beam monitoring system 154 and/or one or more controllable components thereof; and/or one or more gaseous ionization detectors 158 and/or one or more controllable components thereof. Additionally, or in the alternative, the control system 104 may be configured to perform control operations, such as computer-executable operations. For example, exemplary control operations may include determining one or more parameters of an energy beam 142 based at least in part on data from one or more gaseous ionization detectors 158. Additionally, or in the alternative, exemplary control operations may include determining one or more control commands based at least in part on data from one or more gaseous ionization detectors 158. Additionally, or in the alternative, exemplary control operations may include controlling one or more parameters of an energy beam 142 based at least in part on data from one or more gaseous ionization detectors 158.

As shown in FIG. 8, an exemplary control system 104 includes a controller 800. The controller may include one or more control modules 802 configured to cause the controller 800 to perform one or more control operations. For example, the one or more control modules 802 may include an irradiation control module 900 as described herein with reference to FIG. 9. The one or more control modules 802 may include control logic executable to determine one or more operating parameters for an additive manufacturing machine 102, such as setpoints for one or more irradiation parameters, including, by way of example, energy, energy distribution, current, current distribution, power (e.g., energy×current), power distribution, intensity (e.g., energy per unit area), intensity distribution, energy density (e.g., energy×current per unit area), current density, bunch length, emittance, longitudinal emittance, transverse emittance, energy spread, spot size, convergence, depth of field, focal point, filament saturation, alignment, scanning pattern, scanning speed, and so forth. Additionally, or in the alternative, the one or more control modules 802 may include control logic executable to provide control commands configured to control one or more controllable components associated with an additive manufacturing machine 102, such as controllable components associated with an energy beam system 132 and/or a beam monitoring system 154. For example, a control module 802 may be configured to provide one or more control commands based at least in part on one or more setpoints for one or more irradiation parameters, and/or based at least in part on data from one or more gaseous ionization detectors 158.

The controller 800 may be communicatively coupled with an additive manufacturing machine 102. In some embodiments, the controller 800 may be communicatively coupled with one or more components of an additive manufacturing machine 102, such as one or more components of an energy beam system 132, and/or of a beam monitoring system 154. The controller 800 may also be communicatively coupled with a management system 106 and/or a user interface 108.

The controller 800 may include one or more computing devices 804, which may be located locally or remotely relative to the additive manufacturing machine 102, the energy beam system 132, and/or the beam monitoring system 154. The one or more computing devices 804 may include one or more processors 806 and one or more memory devices 808. The one or more processors 806 may include any suitable processing device, such as a microprocessor, microcontroller, integrated circuit, logic device, and/or other suitable processing device. The one or more memory devices 808 may include one or more computer-readable media, including but not limited to non-transitory computer-readable media, RAM, ROM, hard drives, flash drives, and/or other memory devices 808.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 808 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 808 may store information accessible by the one or more processors 806, including computer-executable instructions 810 that can be executed by the one or more processors 806. The instructions 810 may include any set of instructions which when executed by the one or more processors 806 cause the one or more processors 806 to perform operations, including energy beam monitoring operations, energy beam control operations, calibration operations, and/or additive manufacturing operations.

The memory devices 808 may store data 812 accessible by the one or more processors 806. The data 812 can include current or real-time data 812, past data 812, or a combination thereof. The data 812 may be stored in a data library 814. As examples, the data 812 may include data 812 associated with or generated by an additive manufacturing system 100 and/or an additive manufacturing machine 102, including data 812 associated with or generated by the controller 800, an additive manufacturing machine 102, an energy beam system 132, a beam monitoring system 154, a management system 106, a user interface 108, and/or a computing device 804. Such data 812 may pertain to operation of an energy beam system 132 and/or a beam monitoring system 154. For example, data 812 may be data be provided from, derived from, or based at least in part on one or more gaseous ionization detectors 158. The data 812 may also include other data sets, parameters, outputs, information, associated with an additive manufacturing system 100 and/or an additive manufacturing machine 102.

The one or more computing devices 804 may also include a communication interface 816, which may be used for communications with a communication network 818 via wired or wireless communication lines 820. The communication interface 816 may include any suitable components for interfacing with one or more network(s), including for example, transmitters, receivers, ports, controllers, antennas, and/or other suitable components. The communication interface 816 may allow the computing device 804 to communicate with various nodes on the communication network 818, such as nodes associated with the additive manufacturing machine 102, the energy beam system 132, the beam monitoring system 154, the management system 106, and/or a user interface 108. The communication network 818 may include, for example, a local area network (LAN), a wide area network (WAN), SATCOM network, VHF network, a HF network, a Wi-Fi network, a WiMAX network, a gatelink network, and/or any other suitable communication network 818 for transmitting messages to and/or from the controller 800 across the communication lines 820. The communication lines 820 of communication network 818 may include a data bus or a combination of wired and/or wireless communication links.

The communication interface 816 may allow the computing device 804 to communicate with various components of an additive manufacturing system 100 and/or an additive manufacturing machine 102 communicatively coupled with the communication interface 816 and/or communicatively coupled with one another, including an energy beam system 132 and/or a beam monitoring system 154. The communication interface 816 may additionally or alternatively allow the computing device 804 to communicate with the management system 106 and/or the user interface 108. The management system 106 may include a server 822 and/or a data warehouse 824. As an example, at least a portion of the data 812 may be stored in the data warehouse 824, and the server 822 may be configured to transmit data 812 from the data warehouse 824 to the computing device 804, and/or to receive data 812 from the computing device 804 and to store the received data 812 in the data warehouse 824 for further purposes. The server 822 and/or the data warehouse 824 may be implemented as part of a control system 104 and/or as part of the management system 106.

Figure 9:
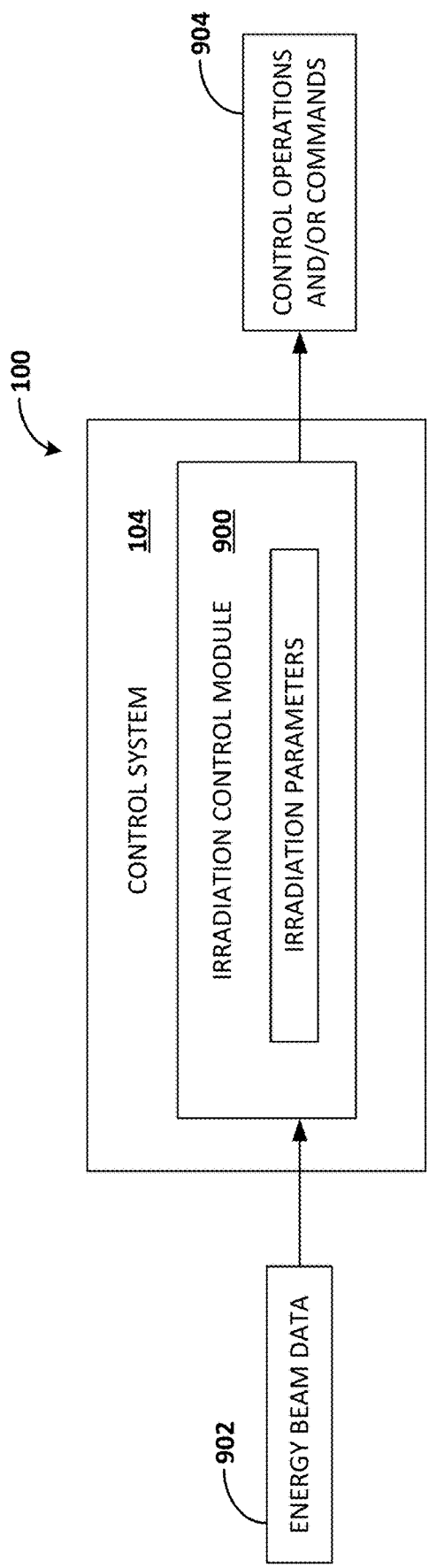
FIG. 9 schematically depicts an exemplary irradiation control module.

Referring now to FIG. 9, an exemplary irradiation control module 900 will be described. An irradiation control module 900 may be included as part of a control system 104 and/or controller 800 for an additive manufacturing machine 102. Additionally, or in the alternative, an irradiation control module 900 may be provided separately from the control system 104, such as with a separate controller 800 and/or a separate computing device 804 communicatively coupled with the control system 104 and/or additive manufacturing machine 102. As shown, an irradiation control module 900 may receive energy beam data 902. The energy beam data 902 may include data 812 from one or more gaseous ionization detectors 158. Additionally, or in the alternative, the energy beam data 902 may include setpoints for one or more irradiation parameters and/or setpoints for one or more controllable components associated with an additive manufacturing machine 102, such as controllable components associated with an energy beam system 132 and/or a beam monitoring system 154. Further additionally, or in the alternative, the energy beam data 902 may include data 812 from one or more controllable components associated with an additive manufacturing machine 102, such as controllable components associated with an energy beam system 132 and/or a beam monitoring system 154.

The irradiation control module 900 may be configured to determine one or more control operations and/or commands 904 based at least in part on the energy beam data 902. In some embodiments, an irradiation control module 900 may be configured to determine one or more irradiation parameters, including, by way of example, energy, energy distribution, current, current distribution, power (e.g., energy x current), power distribution, intensity (e.g., energy per unit area), intensity distribution, energy density (e.g., energy× current per unit area), current density, bunch length, emittance, longitudinal emittance, transverse emittance, energy spread, spot size, convergence, depth of field, focal point, filament saturation, alignment, scanning pattern, scanning speed, and so forth. The one or more control operations may be configured to determine such one or more irradiation parameters. The one or more control operations and/or the one or more control commands may be based at least in part on one or more irradiation parameters determined by the irradiation control module. The one or more irradiation parameters may be determined based at least in part on the energy beam data 902, such as data 812 from one or more gaseous ionization detectors 158

Figure 10:
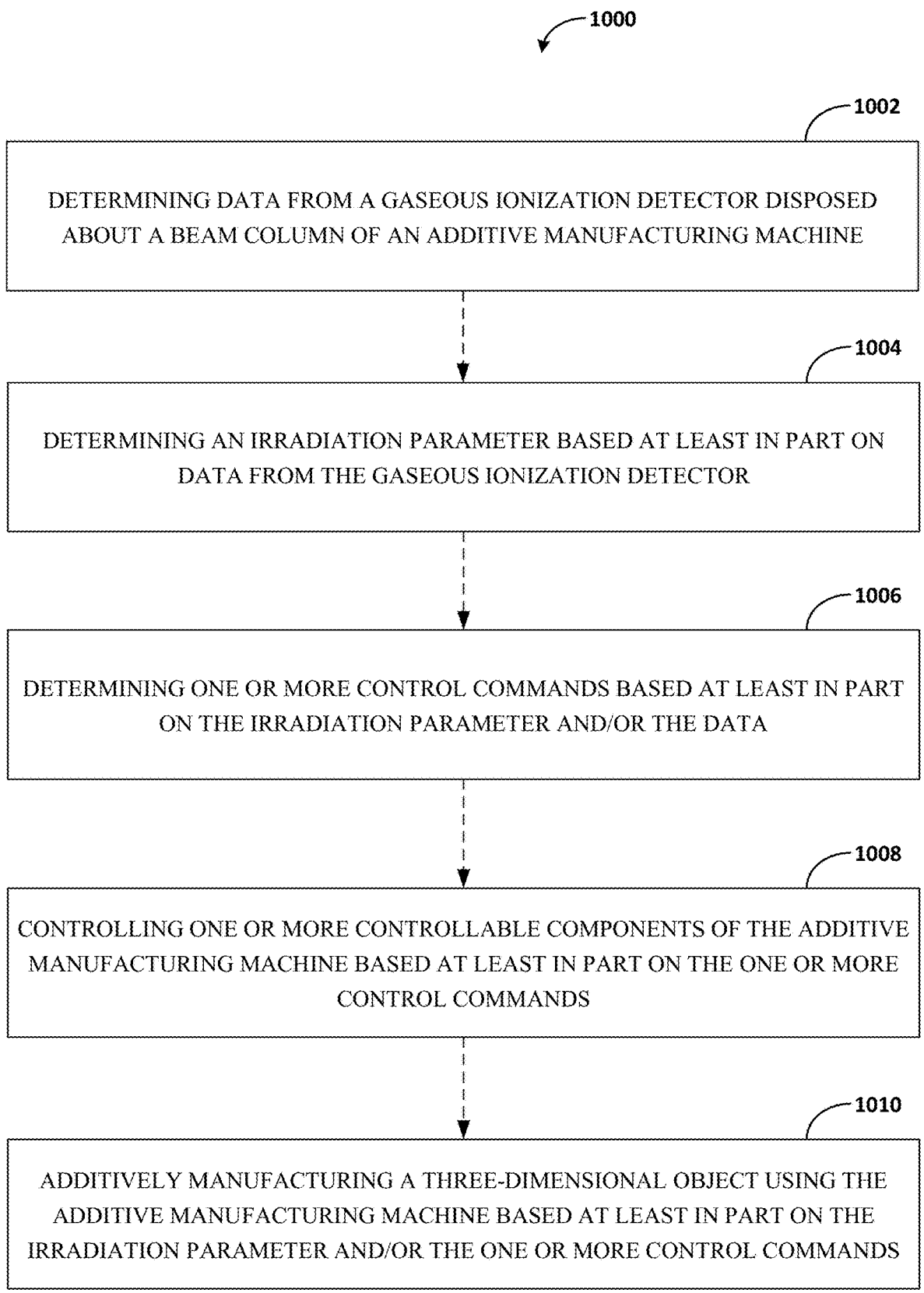
FIG. 10 shows a flow chart depicting an exemplary method of additively manufacturing a three-dimensional object.

Now turning to FIG. 10, exemplary methods determining and/or controlling one or more irradiation parameters, and/or methods of additively manufacturing three-dimensional objects, will be described. As shown, an exemplary method 1000 may include, at block 1002, determining data 812 from a gaseous ionization detector 158 disposed about a beam column 145 of an additive manufacturing machine 102. Additionally, or in the alternative, an exemplary method 1000 may include, at block 1004, determining an irradiation parameter based at least in part on the data 812 from the gaseous ionization detector 158. At block 1006, an exemplary method 1000 may additionally or alternatively include determining one or more control commands based at least in part on the irradiation parameter and/or the data 812. Additionally, or in the alternative, an exemplary method 1000 may include, at block 1008, controlling one or more controllable components of the additive manufacturing machine 102 based at least in part on the one or more control commands. At block 1010, an exemplary method 1000 may include additively manufacturing a three-dimensional object 116 using the additive manufacturing machine 102 based at least in part on the one or more control commands.

Further aspects of the invention are provided by the subject matter of the following clauses:

1. An additive manufacturing machine, comprising: a beam source; a process chamber; a beam column operably coupled to the process chamber and/or defining a portion of the process chamber; and a gaseous ionization detector disposed about the beam column, the gaseous ionization detector configured to detect elementary particles corresponding to an ionizing gas ionized by an energy beam from the beam source.

2. The additive manufacturing machine of any clause herein, comprising: one or more electrostatic lenses disposed about the beam column; and a control system; wherein the control system comprises a control module configured to control the one or more electrostatic lenses based at least in part on data from the gaseous ionization detector.

3. The additive manufacturing machine of any clause herein, wherein the one or more electrostatic lenses comprises: an astigmatism lens, a focusing lens, and/or a deflection lens.

4. The additive manufacturing machine of any clause herein, comprising: a plurality of gaseous ionization detectors, the plurality of gaseous ionization detectors comprising: a first gaseous ionization detector disposed upstream or downstream from the astigmatism lens; and/or a second gaseous ionization detector disposed upstream or downstream from the focusing lens; and/or a third gaseous ionization detector disposed upstream or downstream from the deflection lens.

5. The additive manufacturing machine of any clause herein, wherein the gaseous ionization detector occupies all or a portion of a circumference of the beam column.

6. The additive manufacturing machine of any clause herein, wherein the gaseous ionization detector comprises a curved gaseous ionization detector.

7. The additive manufacturing machine of any clause herein, comprising: a plurality of gaseous ionization detectors disposed circumferentially about the beam column.

8. The additive manufacturing machine of any clause herein, wherein the ionizing gas comprises: helium, neon, argon, krypton, and/or xenon.

9. The additive manufacturing machine of any clause herein, comprising: an ionizing gas system configured to supply the ionizing gas to the beam column and/or to the process chamber.

10. The additive manufacturing machine of any clause herein, wherein the ionizing gas system comprises: an ionizing gas sensor configured to determine a concentration, pressure, and/or flow rate of the ionizing gas.

11. The additive manufacturing machine of any clause herein, wherein the gaseous ionization detector comprises: an ionizing gas controller configured to control the concentration, pressure, and/or flow rate of the ionizing gas based at least in part on a determination from the ionizing gas sensor.

12. The additive manufacturing machine of any clause herein, wherein the gaseous ionization detector comprises: a window; one or more particle multipliers configured to received elementary particles passing through the window and/or secondary particles generated at least in part from the elementary particles, the one or more particle multipliers comprising a secondary election emission material configured to emit secondary electrons when the elementary particles and/or the secondary particles become incident upon the secondary electron emission material; and a sensor configured to determine the secondary electrons emitted by the secondary electron emission material and/or to determine photons emitted from a fluorescent or phosphorescent substance when exposed to the secondary electrons.

13. The additive manufacturing machine of any clause herein, wherein the gaseous ionization detector comprises: one or more microchannel plates, the one or more microchannel plates comprising an array of electron multiplier channels.

14. The additive manufacturing machine of any clause herein, wherein the gaseous ionization detector comprises an electron multiplier lattice, the electron multiplier lattice comprising: a plurality of reflective electron multipliers; and/or a plurality of transmissive electron multipliers.

15. The additive manufacturing machine of any clause herein, comprising: a control system configured to determine one or more irradiation parameters based at least in part on data from one or more gaseous ionization detectors; wherein the one or more irradiation parameters comprises: an alignment or misalignment of the energy beam; and/or a centricity of the energy beam; and/or an inclination angle of the energy beam; and/or a cross-sectional dimension of the energy beam; and/or wherein the one or more irradiation parameters comprises: a beam a beam profile with respect to one or more irradiation parameters of the energy beam, wherein the beam profile comprises: a first beam plane determined from data obtained at least in part from a first one of the one or more gaseous ionization detectors, and a second beam plane determined from data obtained at least in part from a second one of the one or more gaseous ionization detectors; and/or a three-dimensional beam domain determined from at least one of the one or more gaseous ionization detectors.

16. A method of additively manufacturing a three-dimensional object, the method comprising: determining data from a gaseous ionization detector disposed about a beam column of an additive manufacturing machine; and additively manufacturing a three-dimensional object using the additive manufacturing machine based at least in part on the data from the gaseous ionization detector.

17. The method of any clause herein, wherein the data from the gaseous ionization detector comprises an irradiation parameter; and/or wherein the method comprises: determining an irradiation parameter based at least in part on the data from the gaseous ionization detector.

18. The method of any clause herein, comprising: determining one or more control commands based at least in part on the data from the gaseous ionization detector; and controlling one or more controllable components of the additive manufacturing machine based at least in part on the one or more control commands.

19. The method of any clause herein, comprising: additively manufacturing the three-dimensional object based at least in part on the one or more control commands.

20. The method of any clause herein, wherein the method is performed using the additive manufacturing machine of any clause herein.

21. A computer-readable medium comprising computer-executable instructions, which when executed by a processor associated with an additive manufacturing machine, cause the additive manufacturing machine to perform a method comprising: determining data from a gaseous ionization detector disposed about a beam column of an additive manufacturing machine; and additively manufacturing a three-dimensional object using the additive manufacturing machine based at least in part on the data from the gaseous ionization detector.

22. The computer-readable medium of any clause herein, comprising computer-executable instructions, which when executed by a processor associated with an additive manufacturing machine, cause the additive manufacturing machine to perform the method of any clause herein.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing machine, comprising:
a beam source;
a process chamber;
a beam column operably coupled to the process chamber and/or defining a portion of the process chamber; and
a gaseous ionization detector integrated into a portion of the beam column and annularly disposed about the beam source, the gaseous ionization detector configured to detect elementary particles corresponding to an ionizing gas ionized by an energy beam from the beam source.

2. The additive manufacturing machine of claim 1, comprising:
one or more electrostatic lenses disposed about the beam column; and
a control system;
wherein the control system comprises a control module configured to control the one or more electrostatic lenses based at least in part on data from the gaseous ionization detector.

3. The additive manufacturing machine of claim 2, wherein the one or more electrostatic lenses comprises: an astigmatism lens, a focusing lens, and/or a deflection lens.

4. The additive manufacturing machine of claim 3, wherein the gaseous ionization detector comprises:
a plurality of gaseous ionization detectors, the plurality of gaseous ionization detectors comprising:
a first gaseous ionization detector disposed upstream or downstream from the astigmatism lens; and/or
a second gaseous ionization detector disposed upstream or downstream from the focusing lens; and/or
a third gaseous ionization detector disposed upstream or downstream from the deflection lens.

5. The additive manufacturing machine of claim 1, wherein the gaseous ionization detector occupies all or a portion of a circumference of the beam column.

6. The additive manufacturing machine of claim 5, wherein the gaseous ionization detector comprises a curved gaseous ionization detector.

7. The additive manufacturing machine of claim 1, wherein the gaseous ionization detector comprises:
a plurality of gaseous ionization detectors disposed circumferentially about the beam column.

8. The additive manufacturing machine of claim 1, wherein the ionizing gas comprises: helium, neon, argon, krypton, and/or xenon.

9. The additive manufacturing machine of claim 1, comprising:
an ionizing gas system configured to supply the ionizing gas to the beam column and/or to the process chamber.

10. The additive manufacturing machine of claim 9, wherein the ionizing gas system comprises:
an ionizing gas sensor configured to determine a concentration, pressure, and/or flow rate of the ionizing gas.

11. The additive manufacturing machine of claim 10, wherein the gaseous ionization detector comprises:
an ionizing gas controller configured to control the concentration, pressure, and/or flow rate of the ionizing gas based at least in part on a determination from the ionizing gas sensor.

12. The additive manufacturing machine of claim 1, wherein the gaseous ionization detector comprises:
a window;
one or more particle multipliers configured to receive the elementary particles passing through the window and/or secondary particles generated at least in part from the elementary particles, the one or more particle multipliers comprising a secondary electron emission material configured to emit secondary electrons when the elementary particles and/or the secondary particles become incident upon the secondary electron emission material; and
a sensor configured to determine the secondary electrons emitted by the secondary electron emission material and/or to determine photons emitted from a fluorescent or phosphorescent substance when exposed to the secondary electrons.

13. The additive manufacturing machine of claim 1, wherein the gaseous ionization detector comprises:
one or more microchannel plates, the one or more microchannel plates comprising an array of electron multiplier channels.

14. The additive manufacturing machine of claim 1, wherein the gaseous ionization detector comprises an electron multiplier lattice, the electron multiplier lattice comprising:
a plurality of reflective electron multipliers; and/or
a plurality of transmissive electron multipliers.

15. The additive manufacturing machine of claim 1, comprising:
a control system configured to determine one or more irradiation parameters based at least in part on data from one or more gaseous ionization detectors;
wherein the one or more irradiation parameters comprises:
an alignment or misalignment of the energy beam; and/or
a centricity of the energy beam; and/or
an inclination angle of the energy beam; and/or
a cross-sectional dimension of the energy beam; and/or
wherein the one or more irradiation parameters comprises:
a beam profile with respect to the one or more irradiation parameters of the energy beam, wherein the beam profile comprises:
a first beam plane determined from data obtained at least in part from a first one of the one or more gaseous ionization detectors, and a second beam plane determined from data obtained at least in part from a second one of the one or more gaseous ionization detectors; and/or
a three-dimensional beam domain determined from at least one of the one or more gaseous ionization detectors.

* * * * *